United States Patent
Mitani et al.

(10) Patent No.: US 10,704,957 B2
(45) Date of Patent: Jul. 7, 2020

(54) IMAGING DEVICE AND IMAGING METHOD

(71) Applicant: Sony Corporation, Tokyo (JP)

(72) Inventors: Hitoshi Mitani, Kanagawa (JP); Masafumi Wakazono, Tokyo (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 16/302,400

(22) PCT Filed: Aug. 9, 2017

(86) PCT No.: PCT/JP2017/028918
§ 371 (c)(1),
(2) Date: Nov. 16, 2018

(87) PCT Pub. No.: WO2018/034211
PCT Pub. Date: Feb. 22, 2018

(65) Prior Publication Data
US 2019/0170586 A1    Jun. 6, 2019

(30) Foreign Application Priority Data

Aug. 18, 2016    (JP) ................. 2016-160549

(51) Int. Cl.
*G01J 4/04* (2006.01)
*H04N 5/235* (2006.01)
(Continued)

(52) U.S. Cl.
CPC ............. *G01J 4/04* (2013.01); *G01J 3/447* (2013.01); *G01J 4/00* (2013.01); *H04N 5/2355* (2013.01);
(Continued)

(58) Field of Classification Search
CPC ........ G01J 4/00; G01J 4/02; G01J 4/04; G01J 2004/001; G01J 2004/002;
(Continued)

(56) References Cited

U.S. PATENT DOCUMENTS 8,078,048 B2 *  12/2011  Kuroki ................. H04N 13/337
                                                              396/322
8,866,960 B2 * 10/2014  Ishigaki .................... B60R 1/00
                                                              348/148
(Continued)

FOREIGN PATENT DOCUMENTS

JP    2001157109 A    6/2001
JP    2011237646 A   11/2011
(Continued)

OTHER PUBLICATIONS

Japanese Office Action dated Feb. 4, 2020 for corresponding Japanese Application No. 2016-160549.

*Primary Examiner* — Gordon J Stock, Jr.
(74) *Attorney, Agent, or Firm* — Michael Best & Friedrich LLP

(57) ABSTRACT

There is provided an imaging device including: an imaging section including pixels that generate pixel signals on the basis of incident light, the pixels including a polarization pixel having a predetermined polarization direction and a non-polarization pixel; and a polarization rotating section provided on an incidence plane side of the imaging section, and configured to rotate a polarization direction of the incident light.

20 Claims, 20 Drawing Sheets

(51) Int. Cl.
*G01J 4/00* (2006.01)
*H04N 5/355* (2011.01)
*G01J 3/447* (2006.01)

(52) U.S. Cl.
CPC ......... *H04N 5/355* (2013.01); *H04N 5/35563* (2013.01); *G01J 2004/002* (2013.01)

(58) Field of Classification Search
CPC .......... G01J 2004/004; G01J 2004/005; G01J 2004/007; G01J 2004/008; G01J 3/447; H04N 5/2355; H04N 5/23264; H04N 5/2327; H04N 5/2328; H04N 5/355; H04N 5/35545; H04N 5/35563
USPC ......... 356/364–370; 348/143, 148, 298, 302, 348/311, 315; 382/254–275
See application file for complete search history.

(56) References Cited

U.S. PATENT DOCUMENTS

| | | | | |
|---|---|---|---|---|
| 8,982,190 | B2* | 3/2015 | Kobayashi | H04N 13/218 348/49 |
| 10,444,617 | B2* | 10/2019 | Nakatani | G01B 11/00 |
| 10,460,422 | B2* | 10/2019 | Kurita | B60R 11/02 |
| 10,515,999 | B2* | 12/2019 | Segawa | G01J 4/04 |
| 10,574,972 | B2* | 2/2020 | Hirasawa | G06K 9/6202 |
| 2010/0282945 | A1* | 11/2010 | Yokogawa | H04N 5/335 250/208.1 |
| 2012/0206576 | A1* | 8/2012 | Sato | G03B 35/26 348/46 |
| 2014/0055661 | A1* | 2/2014 | Imamura | A61B 5/441 348/342 |
| 2014/0184800 | A1* | 7/2014 | Hirai | G01N 21/958 348/148 |
| 2014/0218486 | A1* | 8/2014 | Kobayashi | H04N 13/207 348/49 |
| 2017/0223339 | A1* | 8/2017 | Kondo | G06T 7/55 |
| 2018/0292310 | A1* | 10/2018 | Kojima | H01L 27/14621 |
| 2019/0260974 | A1* | 8/2019 | Kaizu | H04N 5/2173 |
| 2019/0310487 | A1* | 10/2019 | Mitani | H04N 5/2254 |
| 2019/0385006 | A1* | 12/2019 | Kashitani | H04N 5/232 |

FOREIGN PATENT DOCUMENTS

| | | |
|---|---|---|
| JP | 2011-244309 A | 12/2011 |
| JP | 5562949 B2 | 6/2014 |
| JP | 2014220754 A | 11/2014 |
| JP | 2015055737 A | 3/2015 |
| WO | 2009/147814 A1 | 12/2009 |
| WO | 2009/157129 A1 | 12/2009 |

* cited by examiner

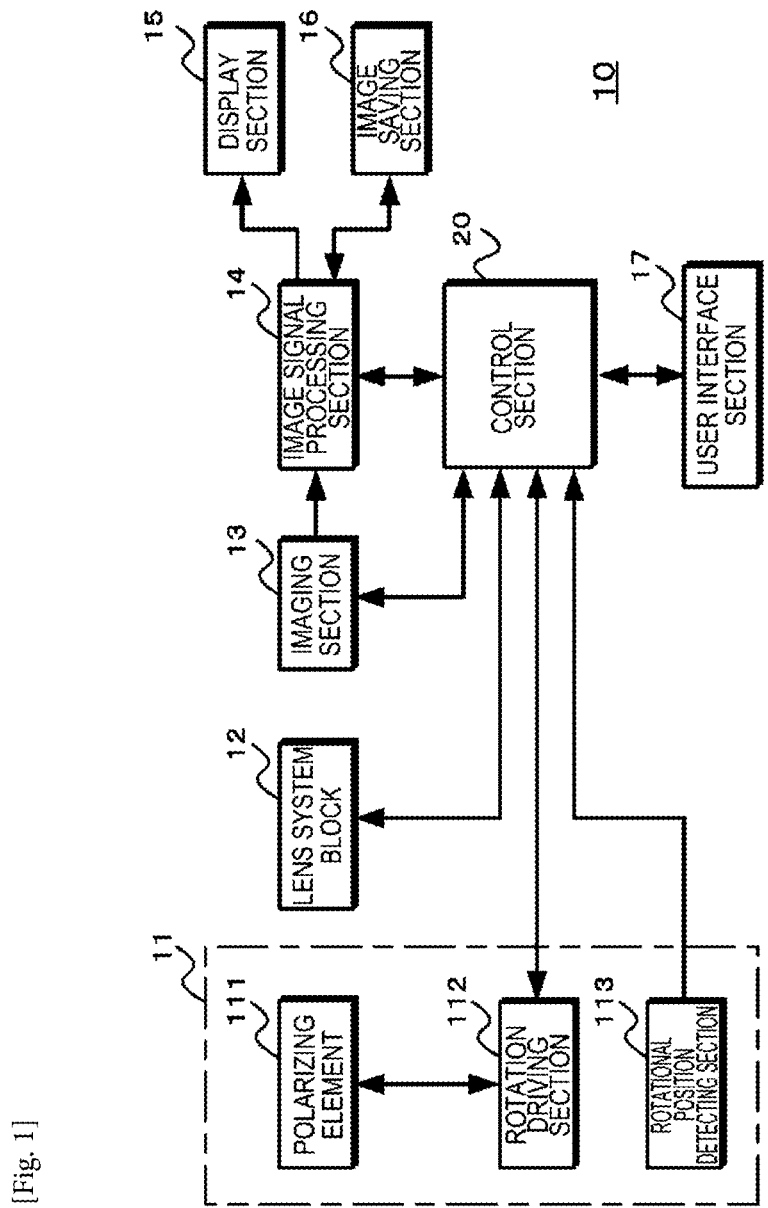
[Fig. 1]

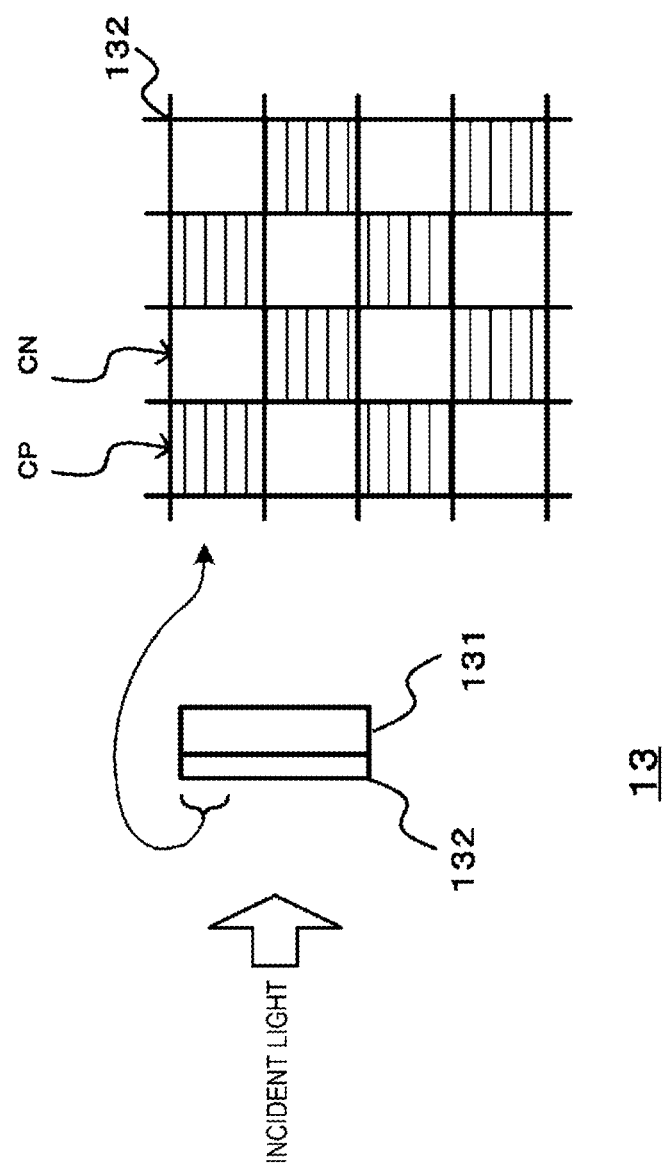

[Fig. 3]
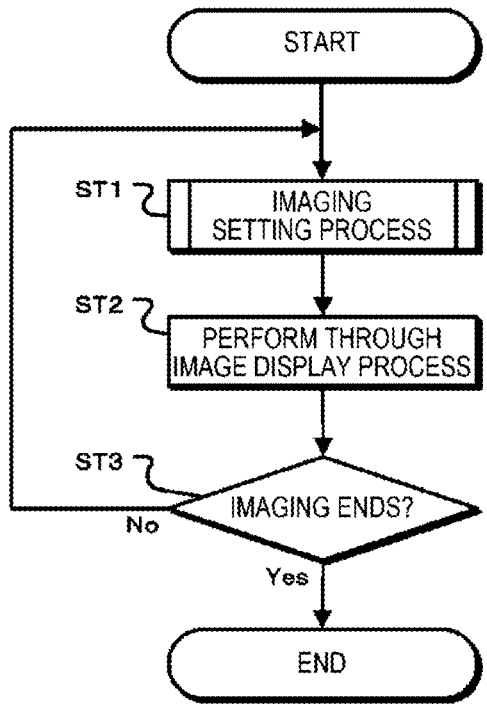
[Fig. 4]
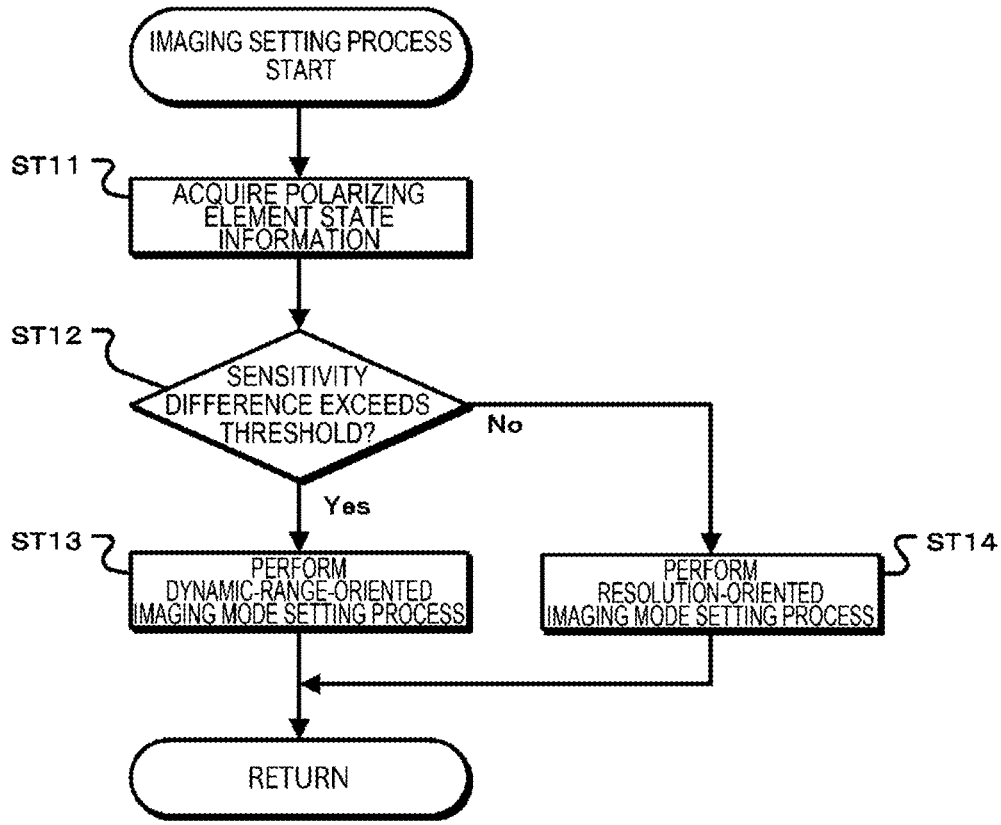

[Fig. 5]
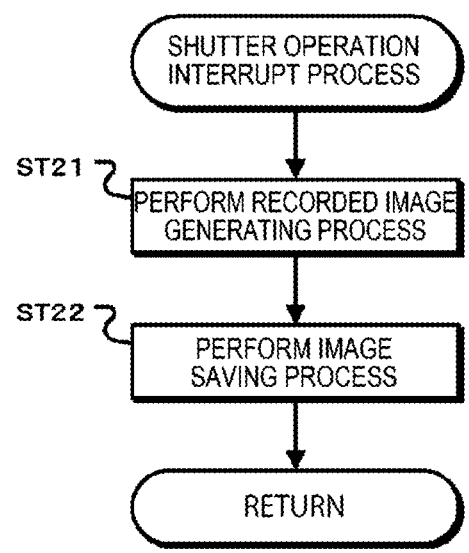

[Fig. 6]
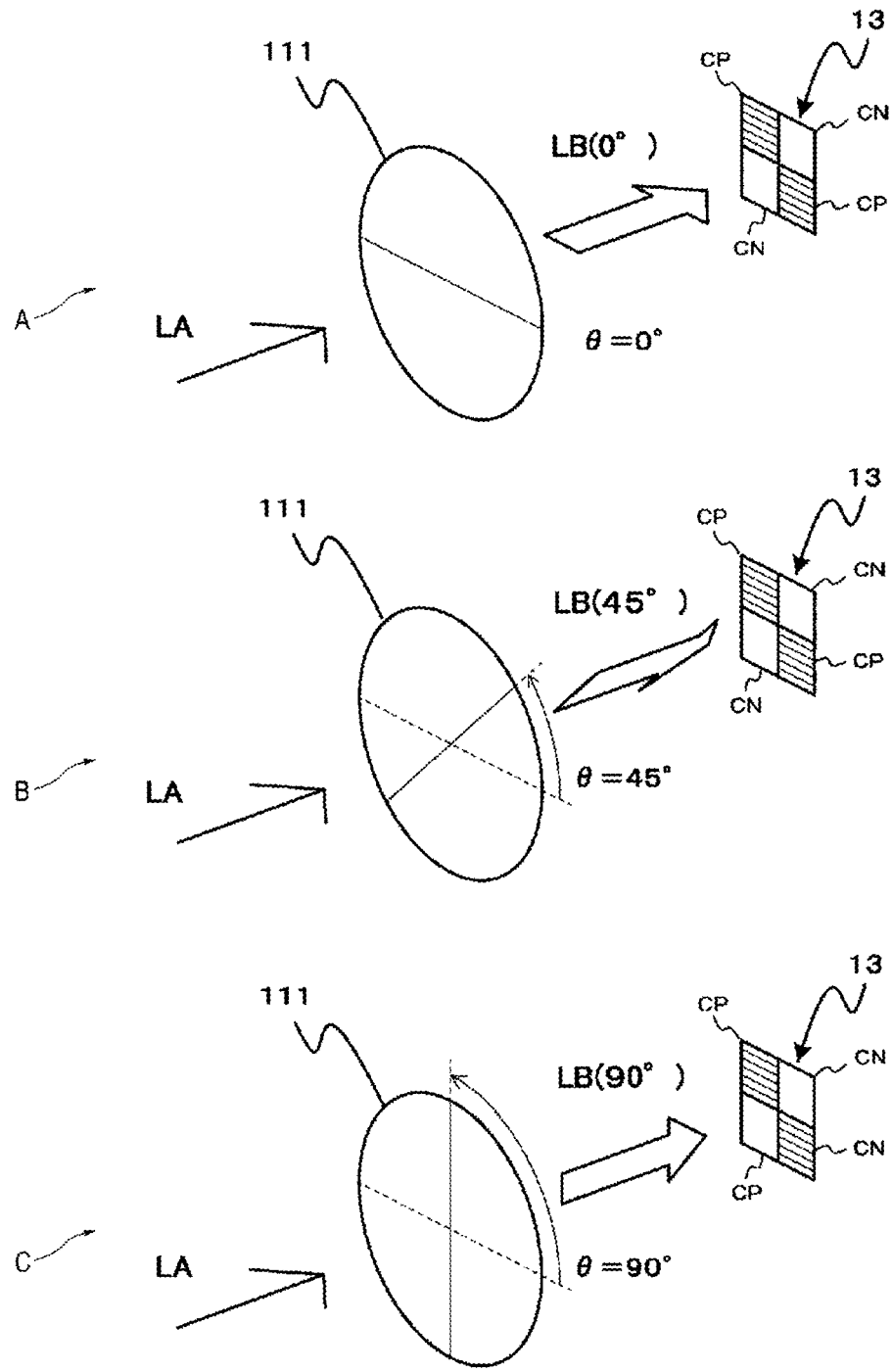

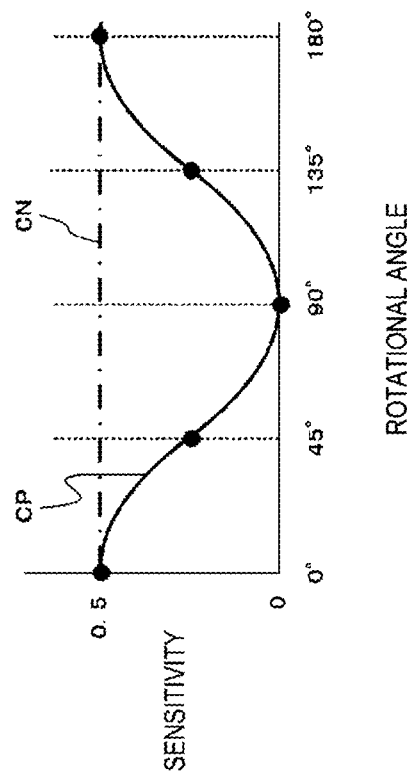
[Fig. 7]

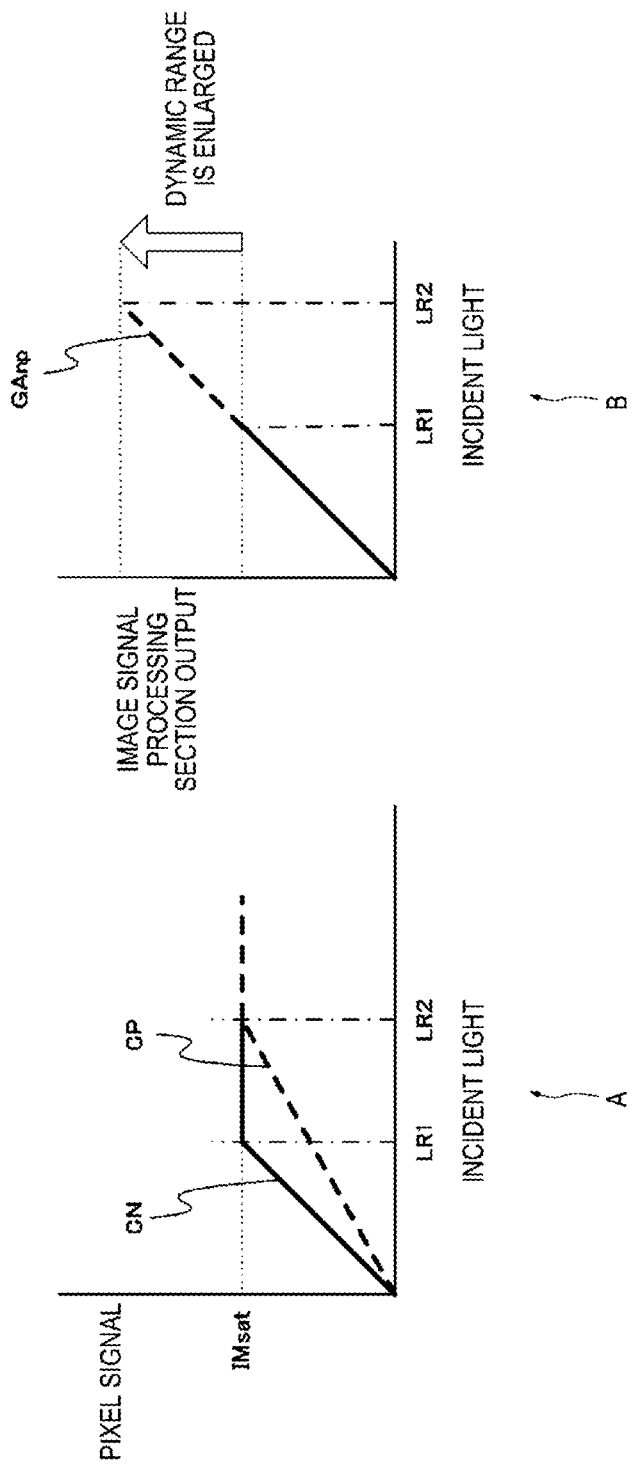

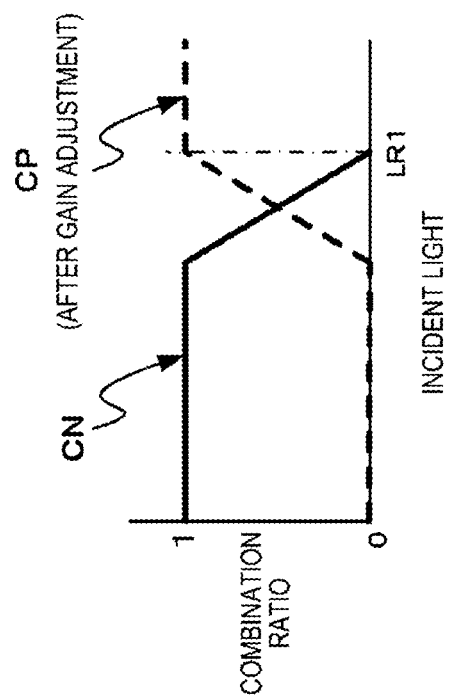
[Fig. 9]

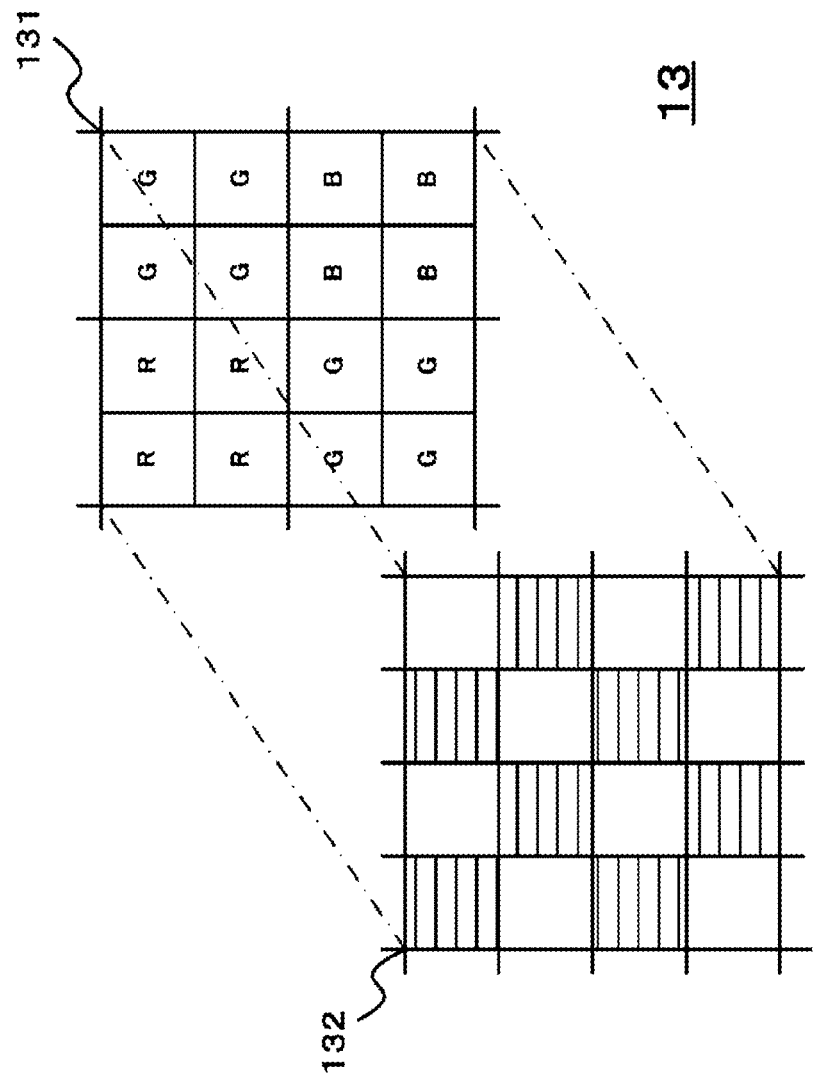

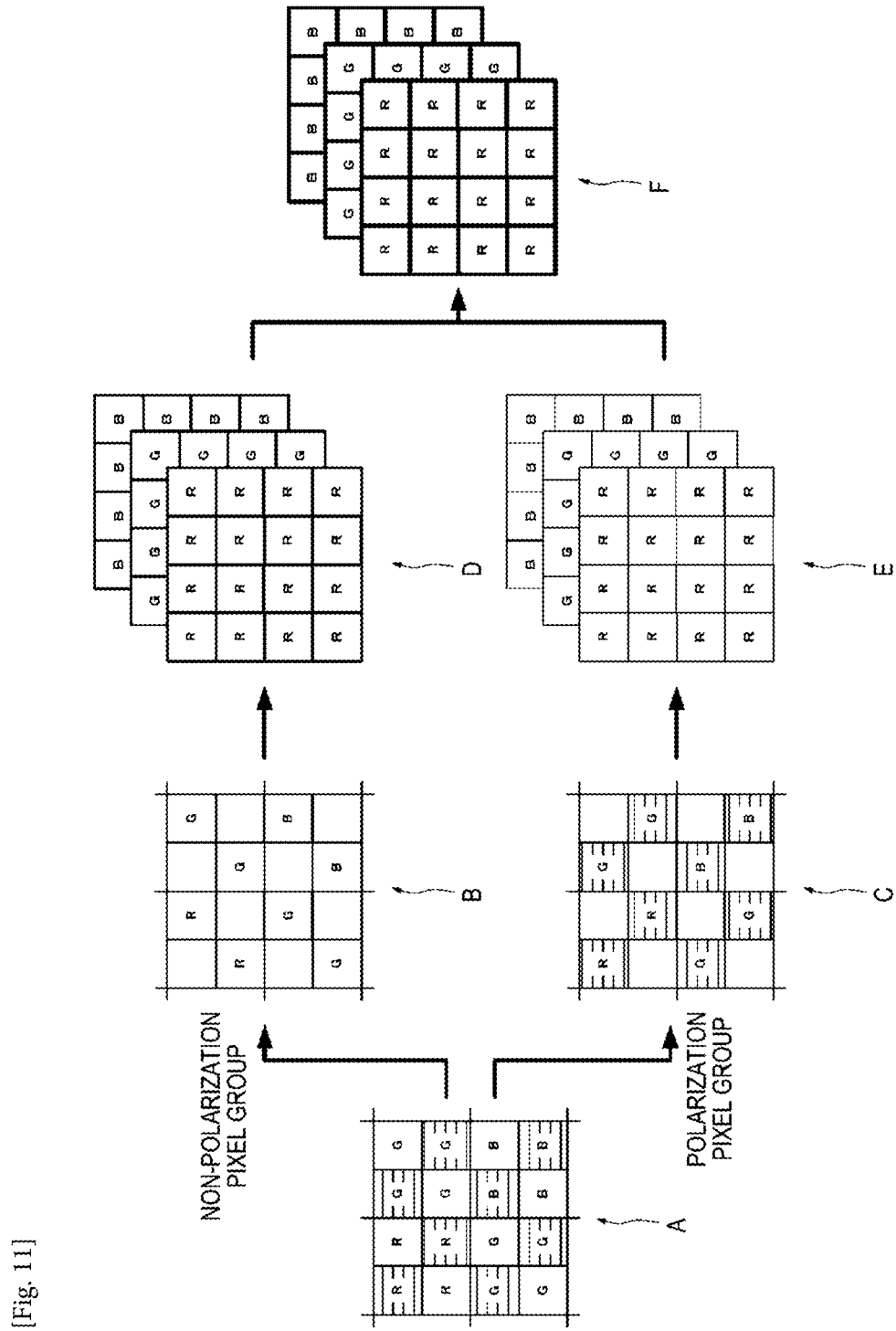

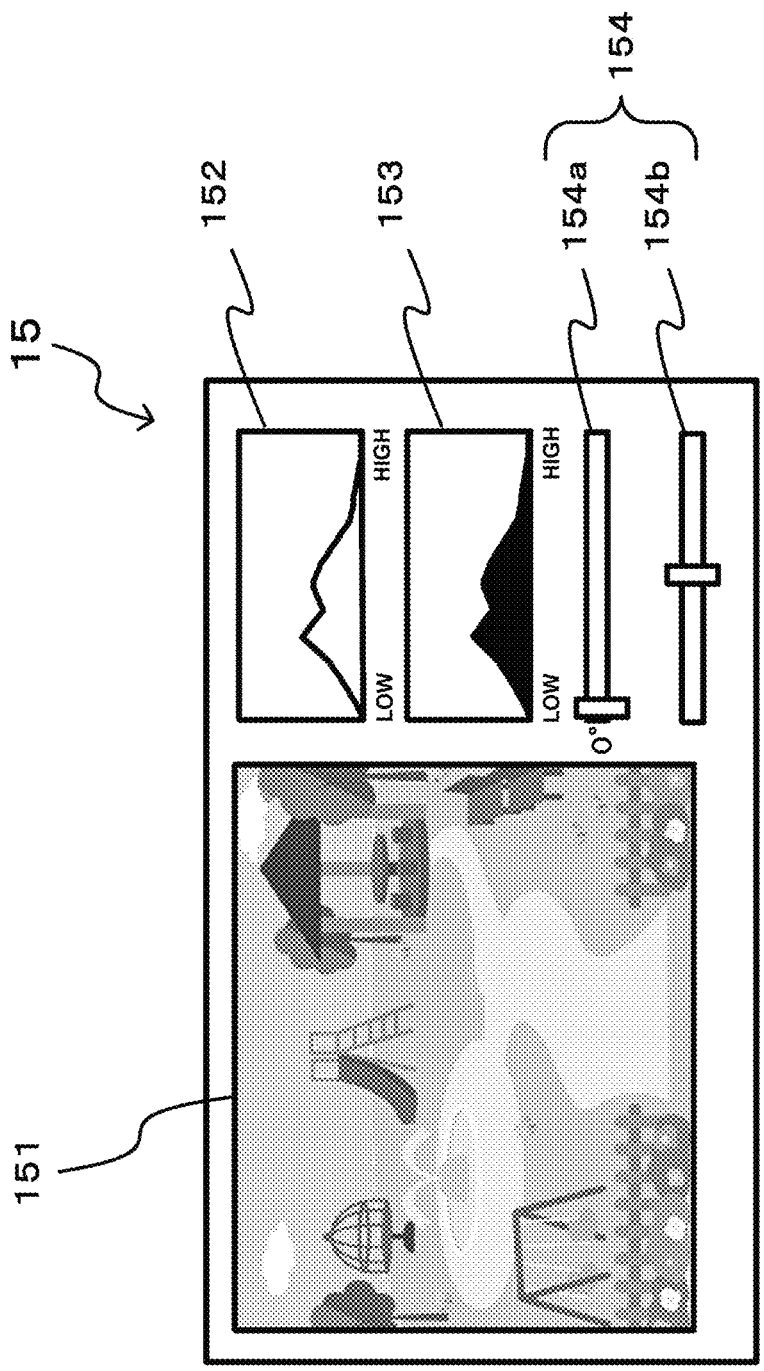

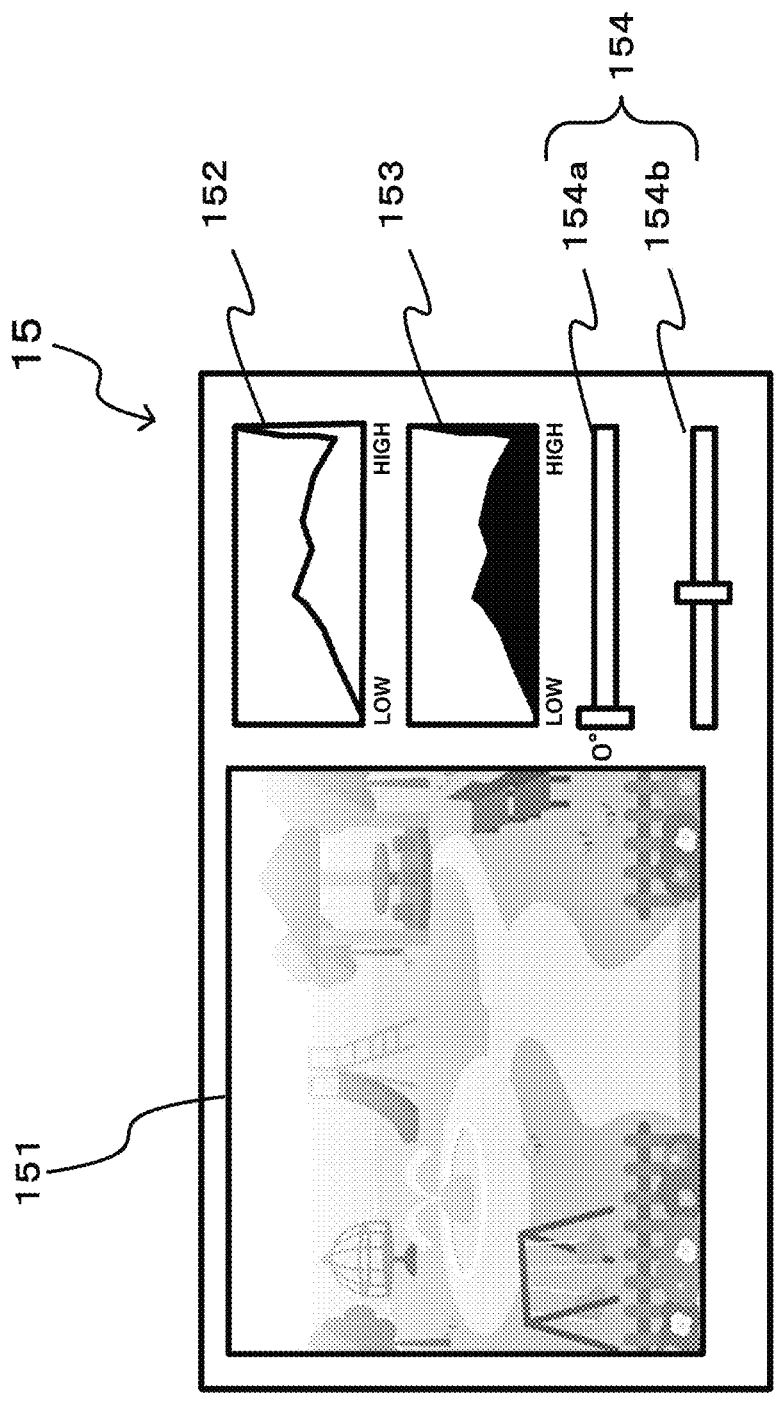

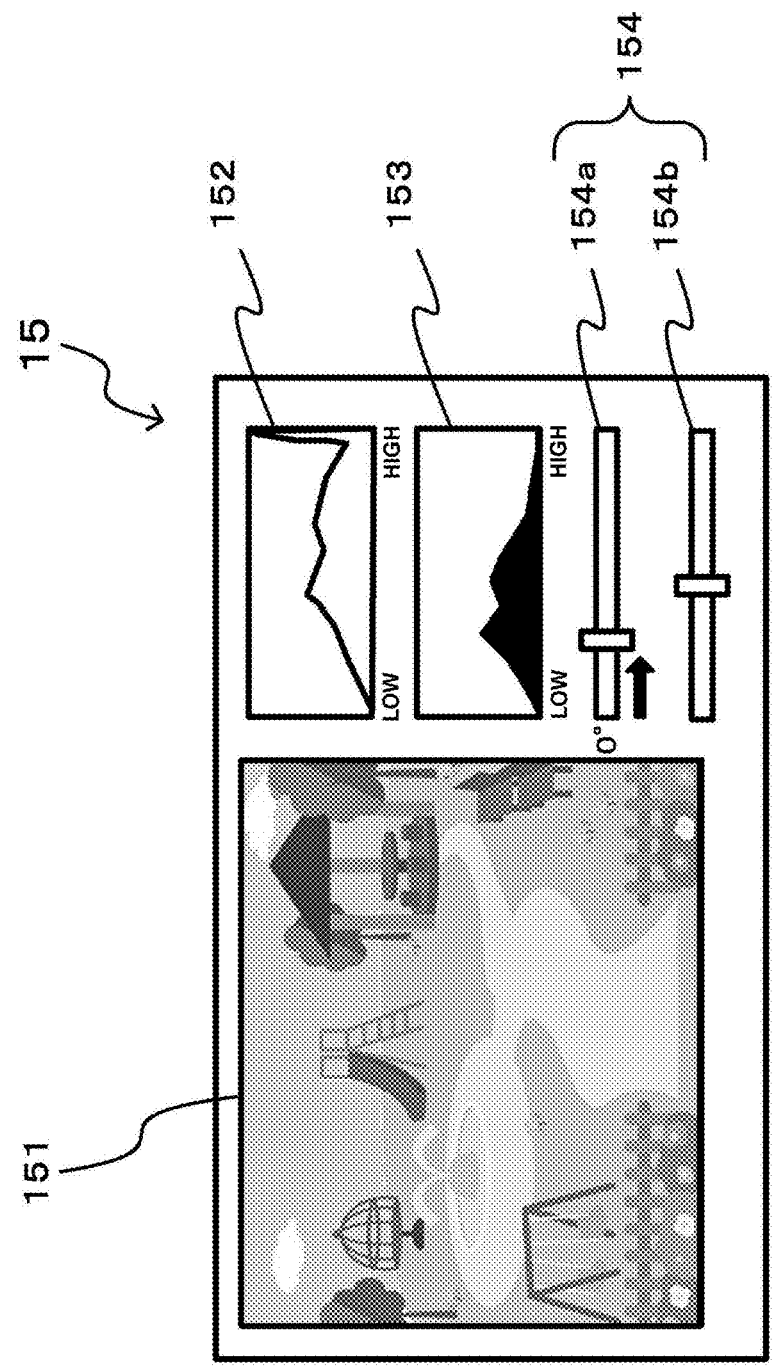

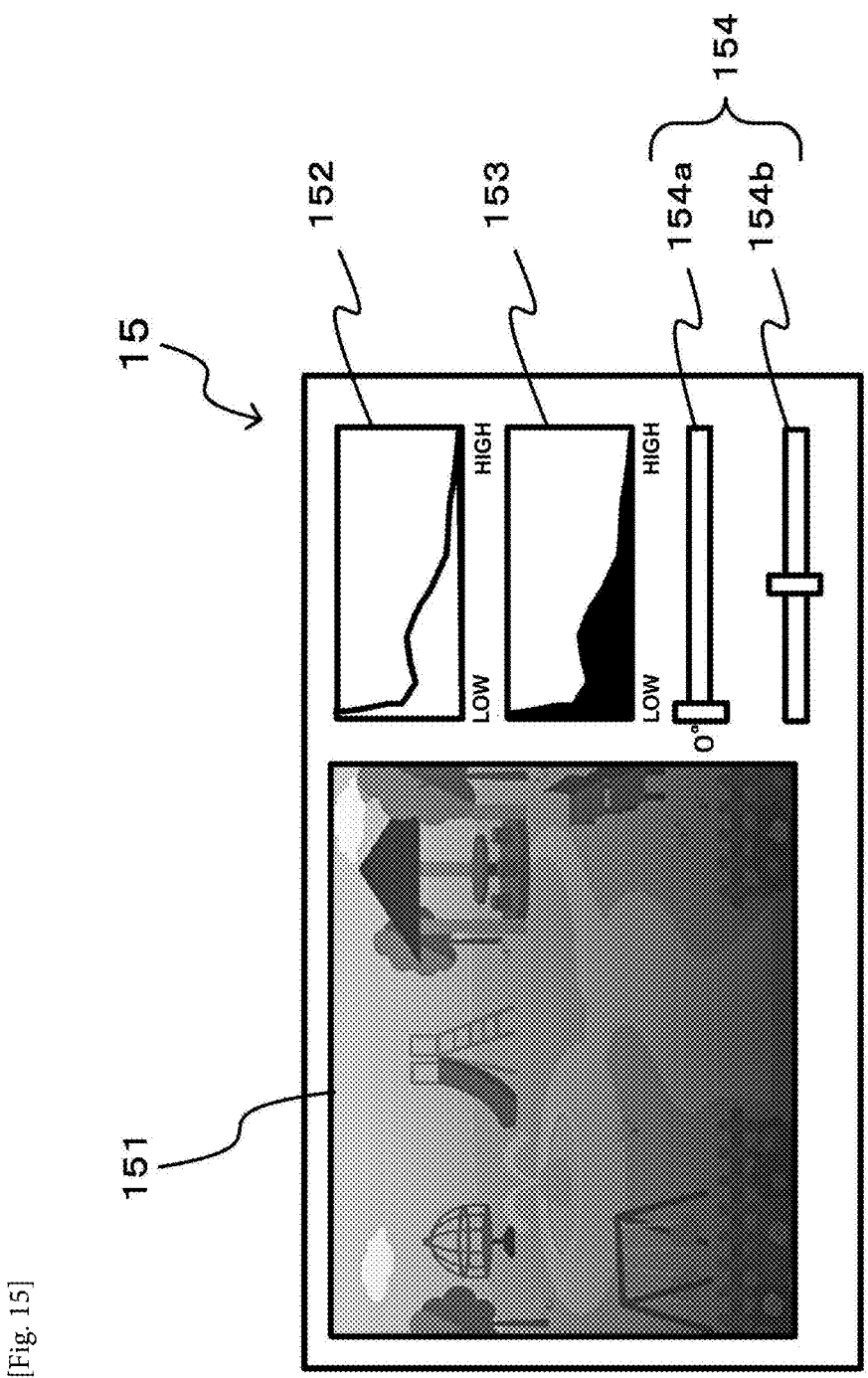

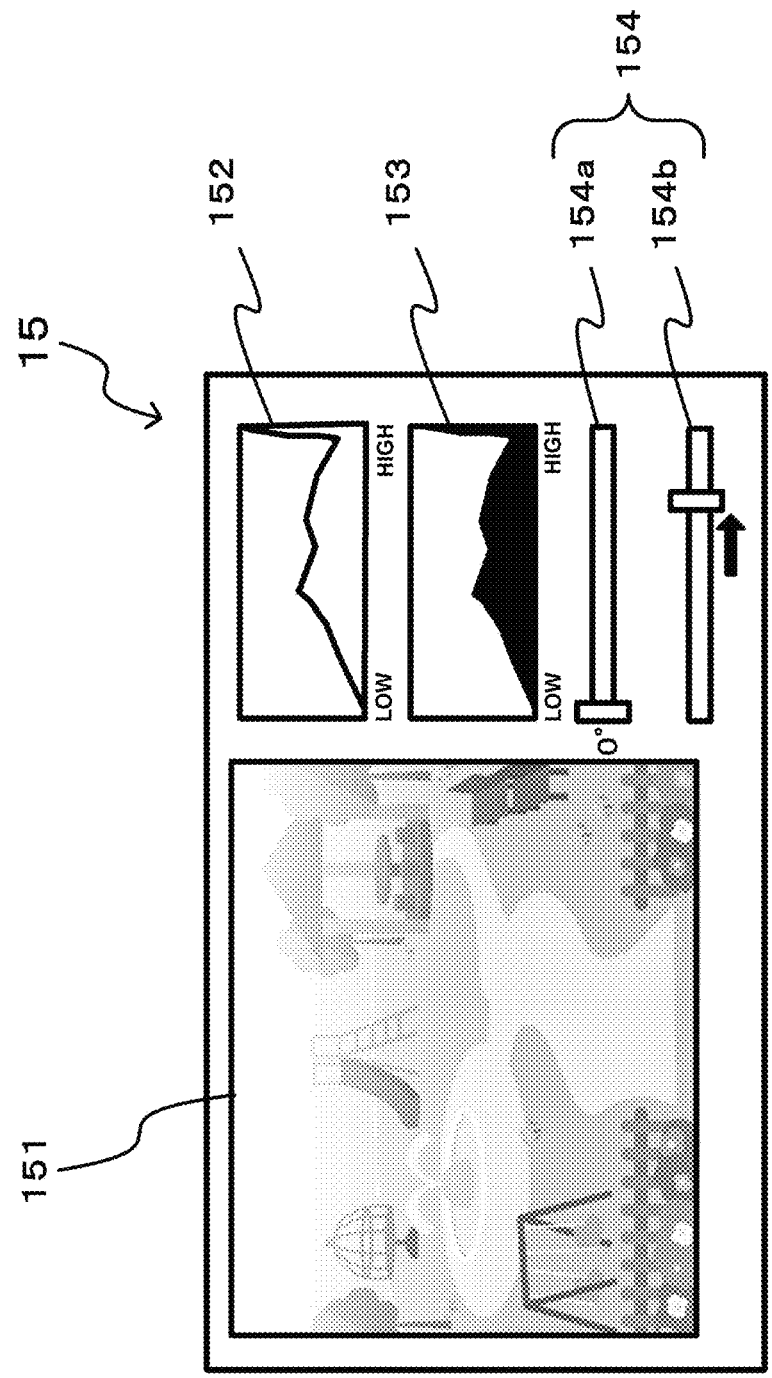

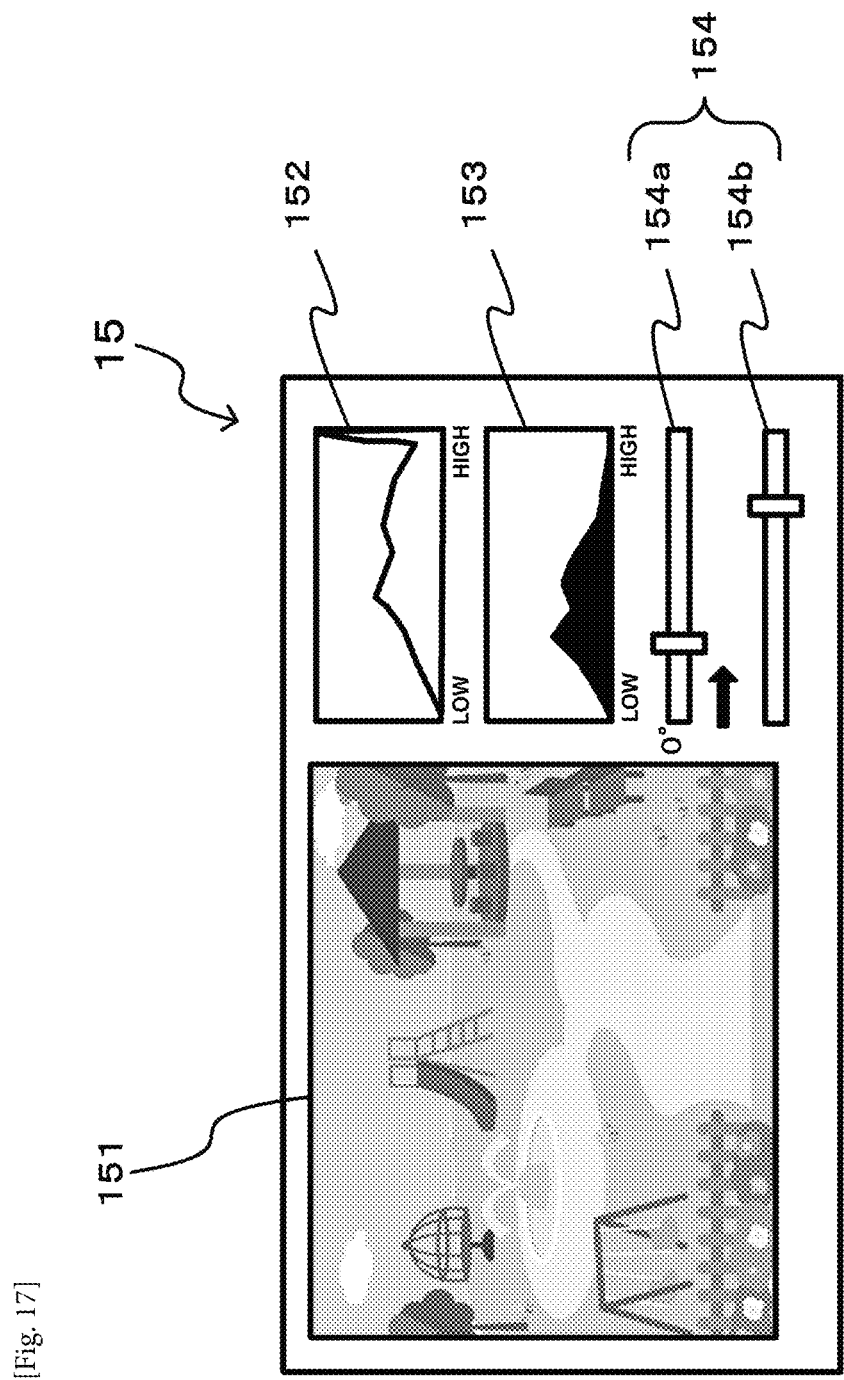

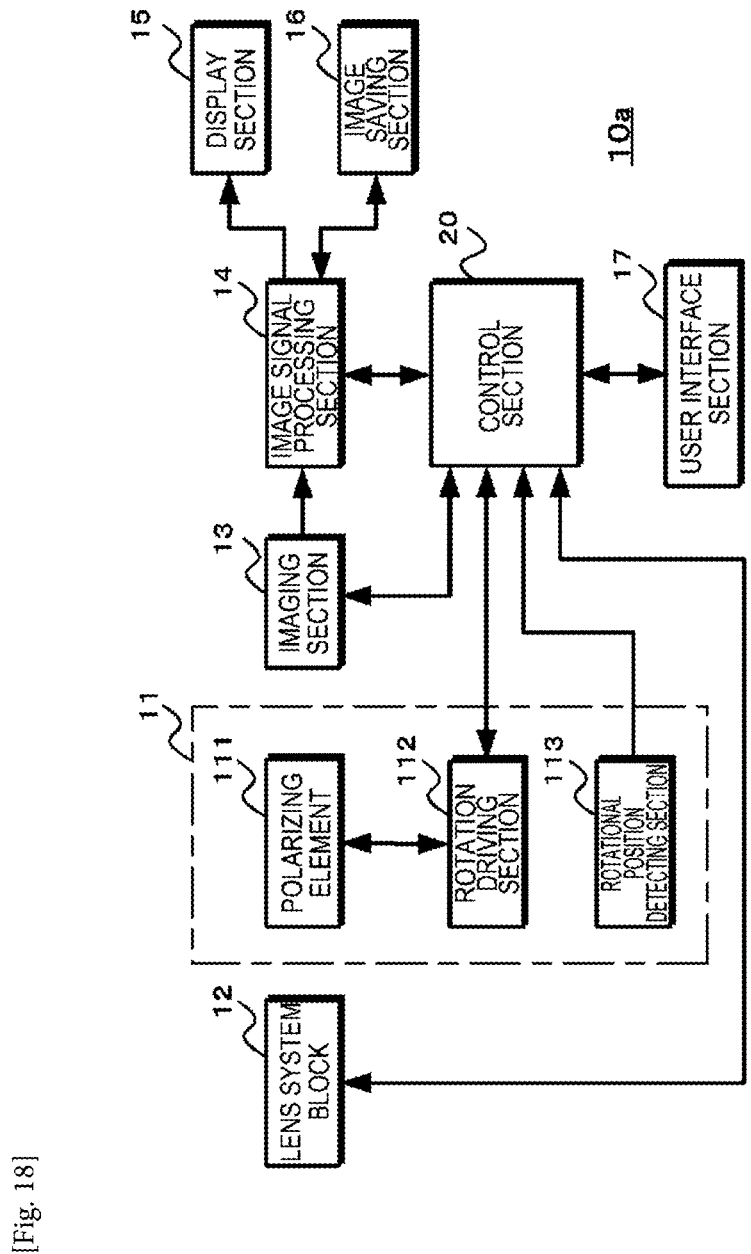
[Fig. 18]

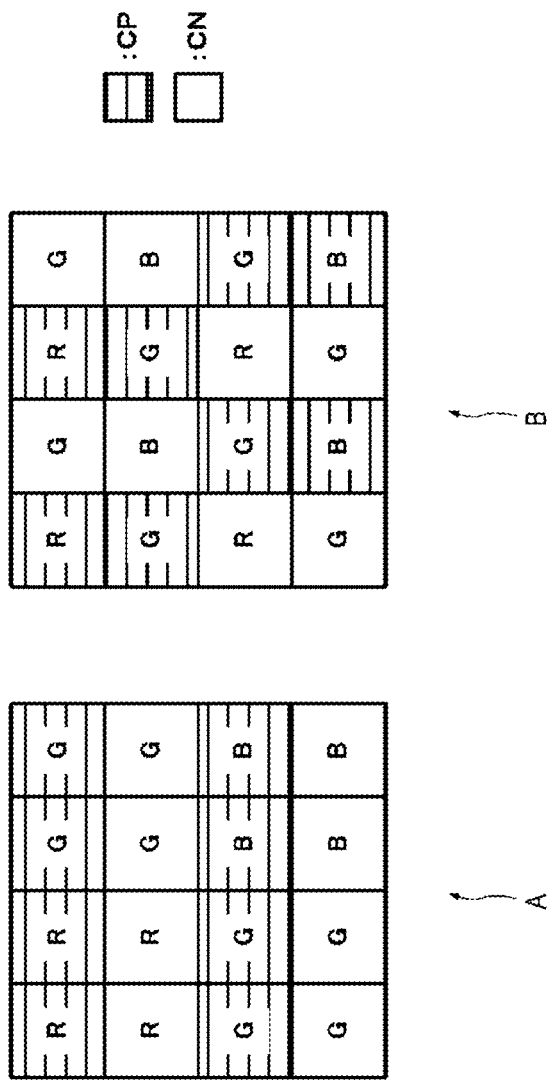
[Fig. 19]

[Fig. 20]
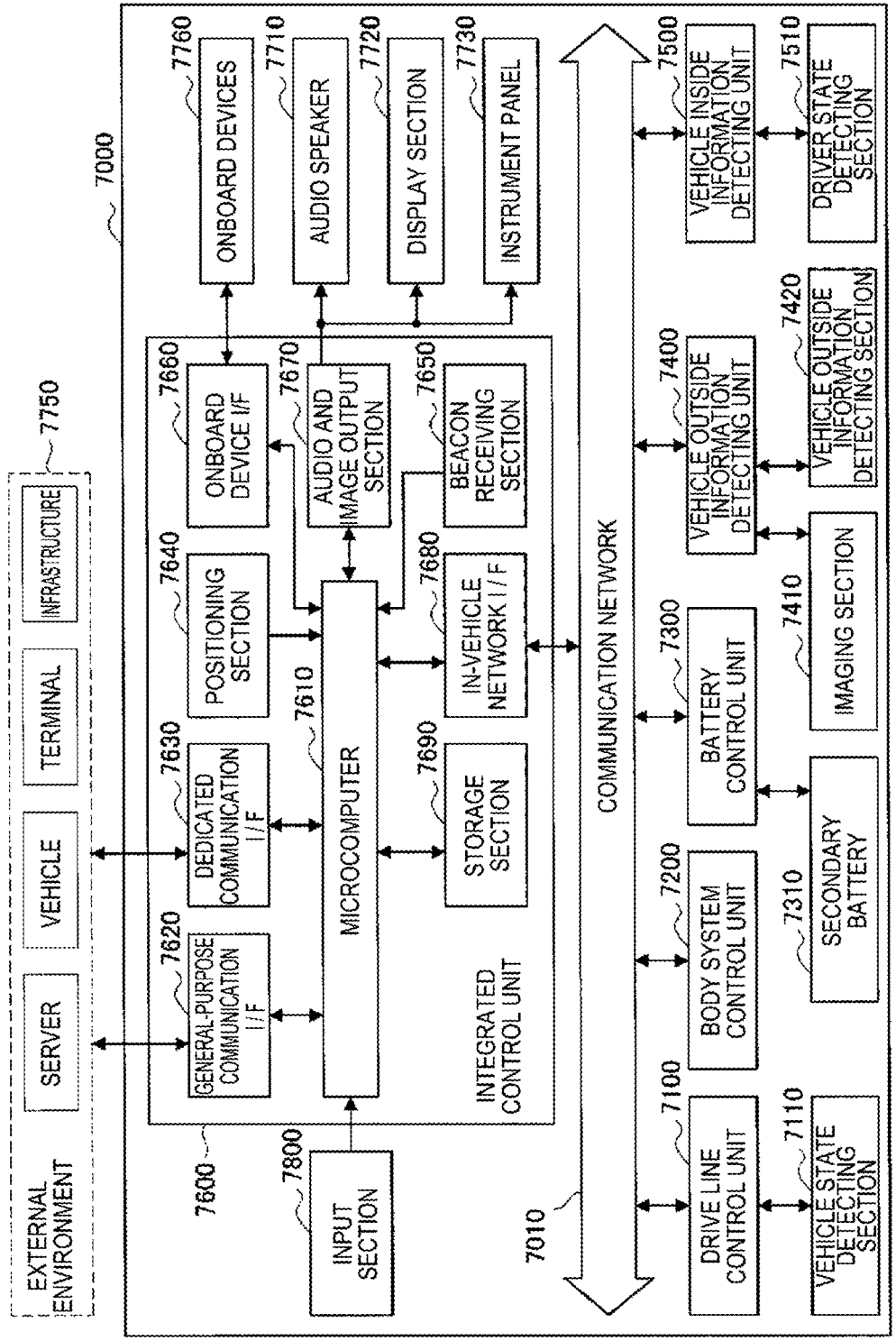

[Fig. 21]
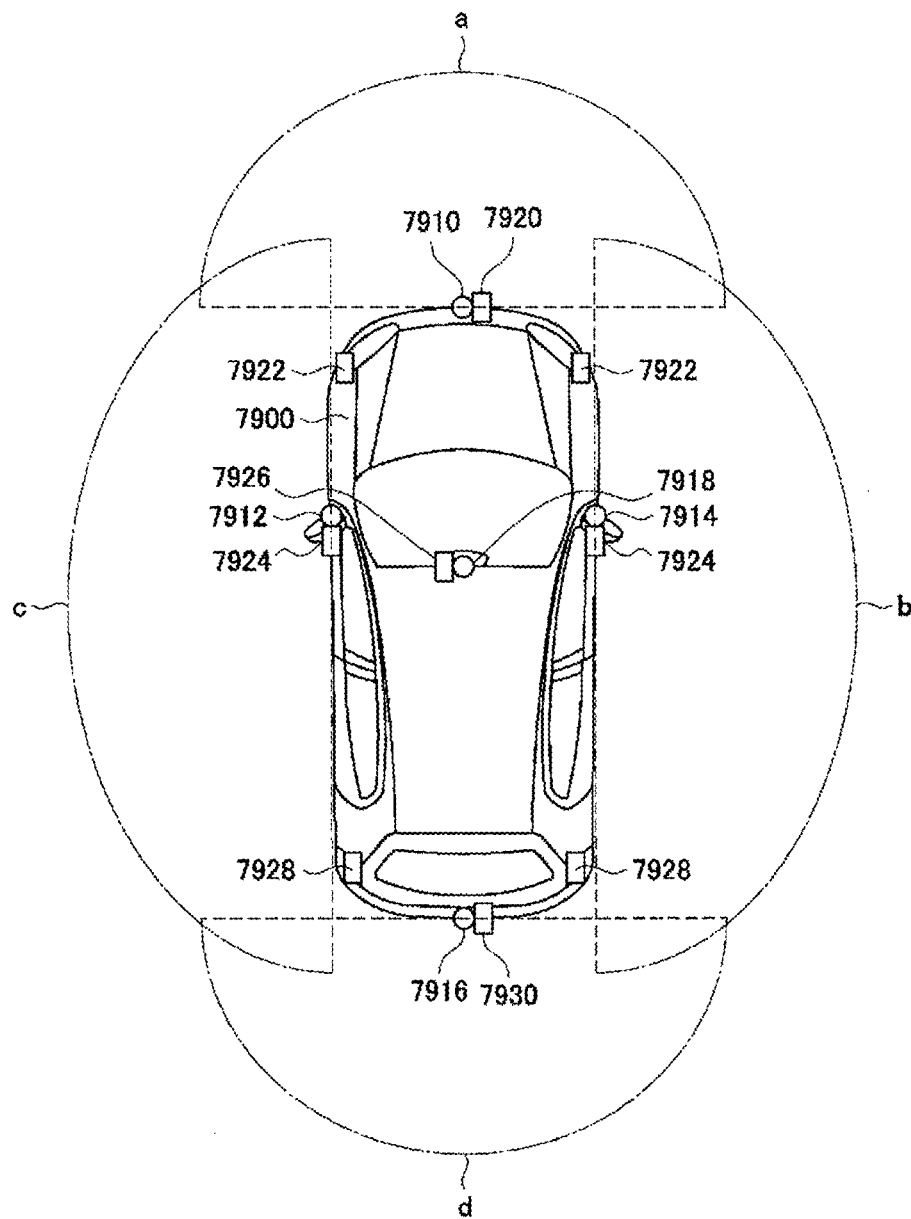

IMAGING DEVICE AND IMAGING METHOD

CROSS REFERENCE TO RELATED APPLICATIONS

This application claims the benefit of Japanese Priority Patent Application JP 2016-160549 filed Aug. 18, 2016, the entire contents of which are incorporated herein by reference.

TECHNICAL FIELD

The present technology relates to an imaging device and an imaging method, and makes it possible to generate a wide dynamic range image that is less blurred even if an object moves.

BACKGROUND ART

The imaging device includes a solid-state image sensor such as a complementary metal oxide semiconductor (CMOS) image sensor or a charge coupled device (CCD) image sensor. Such a solid-state image sensor accumulates the electric charge corresponding to the amount of incident light, and performs photoelectric conversion to output the electrical signal corresponding to the electric charge. The photoelectric converter, however, has an upper limit to electric charge to accumulate. If a certain amount of light or more is received, the amount of accumulated electric charge reaches a saturation level. An object area having a certain level of brightness or higher is set at a saturated luminance level, which is namely referred to as so-called blow out highlights. For example, in PTL 1, images different in exposure time are therefore combined for generating a wide dynamic range image. Further, in PTL 2, there are provided a pixel equipped with a polarizing filter and a pixel equipped with no polarizing filter, thereby enlarging the dynamic range by performing imaging once.

CITATION LIST

Patent Literature

PTL 1: JP 2011-244309A
PTL 2: JP 5562949B

SUMMARY

Technical Problem

Incidentally, if an object or an imaging device moves, a longer exposure time causes a captured image to have more conspicuous motion blurring. A wide dynamic range image into which images different in exposure time are combined is thus likely to have motion blurring. Further, in a case where there are provided a pixel equipped with a polarizing filter and a pixel equipped with no polarizing filter, the pixels have two types of sensitivity at all times. Accordingly, it is not possible to obtain a captured image having high resolution.

An embodiment of the present technology then provides an imaging device and an imaging method that can perform imaging focusing on a dynamic range which is unlikely to cause motion blurring, while varying the dynamic range of an image to be captured, and further acquire a captured image having high resolution in a case where there is no need to enlarge the dynamic range.

Solution to Problem

A first embodiment of the present technology resides in an imaging device including: an imaging section including pixels that generate pixel signals on the basis of incident light, the pixels including a polarization pixel having a predetermined polarization direction and a non-polarization pixel; and a polarization rotating section provided on an incidence plane side of the imaging section, and configured to rotate a polarization direction of the incident light.

In an embodiment of the present technology, the pixels of the imaging section which generate pixel signals on the basis of incident light may include polarization pixel having a predetermined polarization direction and non-polarization pixels. There may be provided a polarization rotating section on the incidence plane side of the imaging section. The polarization rotating section may rotate the polarization direction of the incident light. The polarization rotating section may include, for example, a polarizing element that transmits only a specific polarized wave of the incident light, and a mechanism that rotates the polarizing element at a given angle. The polarization rotating section may rotate the polarizing element in a manner that the sensitivity of a polarization pixel in the imaging section is variable. The polarizing element may be rotated by a motor, or manually rotated by a hand of a user.

Further, the imaging device may include a sensitivity detecting section and an image signal processing section. The sensitivity detecting section may detect the sensitivity of a polarization pixel in the imaging section. For example, the sensitivity detecting section may detect the sensitivity of a polarization pixel on the basis of the polarization direction of incident light or a pixel signal generated by the polarization pixel.

In a case where the sensitivity difference between a non-polarization pixel and a polarization pixel is greater than a threshold, the image signal processing section may vary the dynamic range to generate an image signal of a captured image in accordance with the angle of the polarizing element or the sensitivity detected by the sensitivity detecting section. For example, the image signal processing section may carry out a gain adjustment for the polarization pixel on the basis of the sensitivity detected by the sensitivity detecting section, make an image combination by using the image signals that have been subjected to the gain adjustment, and generate an image signal of the dynamic range corresponding to the sensitivity. Further, in a case where a non-polarization pixel is saturated in an image combination, the image signal processing section may switch an image signal of a captured image generated by using the saturated non-polarization pixel to an image signal of a captured image generated by using a polarization pixel having lower sensitivity than the sensitivity of the non-polarization pixel. For example, the image signal processing section may control a combination ratio between an image signal of a captured image generated by using the non-polarization pixel that is saturated and an image signal of a captured image generated by using the polarization pixel that has low sensitivity in accordance with the incident light, and switch the image signal of the captured image generated by using the non-polarization pixel that is saturated to the image signal of the captured image generated by using the polarization pixel that has low sensitivity.

In a case where the sensitivity difference between the non-polarization pixel and the polarization pixel may be less than or equal to the threshold, the image signal processing section may generate, on the basis of a pixel signal of each pixel, an image signal of a captured image indicating an image of a corresponding pixel. In this case, it is possible to acquire an image having high resolution.

Further, there may be provided a control section that controls the polarization rotating section. The control section may control, for example, the driving of a mechanism that rotates the polarizing element and rotates the polarization direction of the incident light in a manner that the signal strength of the polarization pixel is not saturated. Further, there may be provided a display section. The display section may display a captured image and a user interface image for an operation of rotating the polarization direction of the incident light. Moreover, the display section may display an image indicating the signal strength distribution for the polarization pixels or the non-polarization pixels.

A second embodiment of the present technology resides in an imaging method including: making incident light be incident on an imaging section including pixels via a polarization rotating section, and generating an image signal of a captured image within a dynamic range corresponding to a rotational position of a polarization direction of the incident light, the pixels generating pixel signals on the basis of the incident light and including a polarization pixel having a predetermined polarization direction and a non-polarization pixel.

Advantageous Effects of Invention

According to an embodiment of the present technology, incident light is incident on the imaging section. The imaging section includes pixels that generate pixel signals on the basis of the incident light. The pixels include polarization pixels having a predetermined polarization direction and non-polarization pixels. The polarization direction of the incident light is rotated by the polarization rotating section provided on the incidence plane side of the imaging section. The rotational angle therefore allows the polarization pixels to have the sensitivity corresponding to the polarization direction of the incident light, and it is possible to perform wide dynamic range imaging. It is possible to generate a wide dynamic range captured image that is unlikely to have motion blurring, by carrying out a gain adjustment on the basis of the sensitivity of the polarization pixels and making an image combination using the image signals that have been subjected to the gain adjustment. Further, the polarization rotating section rotates the polarization direction, thereby making it possible to vary the dynamic range. Additionally, the effects described herein are merely exemplified effects, but not limitative. The effects described herein may also be additional effects.

BRIEF DESCRIPTION OF DRAWINGS

FIG. 1 is a diagram exemplifying a configuration of an imaging device.
FIG. 2 is a diagram exemplifying a configuration of an imaging section.
FIG. 3 is a flowchart illustrating an operation of the imaging device.
FIG. 4 is a flowchart illustrating an imaging setting process.
FIG. 5 is a flowchart illustrating an interrupt process.
FIG. 6 illustrates a relationship between incident light, linearly polarized light passing through a polarizing element, and the imaging section.
FIG. 7 is a diagram exemplifying a relationship between a rotational angle of the polarizing element and sensitivity of a polarization pixel in the imaging section.
FIG. 8 is a diagram for describing a gain adjustment and an image combination.
FIG. 9 is a diagram exemplifying a relationship between incident light and a combination ratio.
FIG. 10 is a diagram illustrating a specific example of the imaging section.
FIG. 11 is a diagram illustrating an operation example of an image signal processing section.
FIG. 12 is a diagram exemplifying a display screen of a display section (in a case where imaging is performed in a resolution-oriented imaging mode).
FIG. 13 is a diagram exemplifying a display screen of the display section (in a case where an object image is saturated).
FIG. 14 is a diagram exemplifying a display screen of the display section (in a case where a dynamic range is enlarged).
FIG. 15 is a diagram exemplifying a display screen of the display section (in a case where an object is dark and a blocked up shadow occurs).
FIG. 16 is a diagram exemplifying a display screen of the display section (in a case where a captured image is made brighter by increasing ISO speed).
FIG. 17 is a diagram exemplifying a display screen of the display section (in a case where a dynamic range is enlarged).
FIG. 18 is a diagram exemplifying another configuration of the imaging device.
FIG. 19 is a diagram exemplifying another configuration of the imaging section.
FIG. 20 is a block diagram illustrating an example of a schematic configuration of a vehicle control system.
FIG. 21 is an explanatory diagram illustrating an example of installation positions of a vehicle outside information detecting section and the imaging section.

DESCRIPTION OF EMBODIMENTS

The following describes an embodiment of the present technology. Description will be given in the following order.
1. Configuration of Imaging Device
2. Operation of Imaging Device
2-1. Dynamic-Range-Oriented Imaging Operation and Resolution-Oriented Imaging Operation
2-2. Imaging Operation Examples
3. Another Configuration of Imaging Device
4. Application
<1. Configuration of Imaging Device>
FIG. 1 exemplifies the configuration of an imaging device. An imaging device 10 includes a polarization rotating section 11, a lens system block 12, an imaging section 13, an image signal processing section 14, a display section 15, an image saving section 16, a user interface section 17, and a control section 20.

The polarization rotating section 11 is provided on the incidence plane side of the imaging section 13. The polarization rotating section 11 transmits only a specific polarized wave of the object light incident on the polarization rotating section 11, and makes the specific polarized wave be incident on the imaging section 13. Further, the polarization rotating section 11 can rotate the polarization plane of the transmitted light (which will be referred to as "polarization direction of incident light"). The polarization direction rotating section 11 includes, for example, a polarizing element 111 and a rotation driving section 112. The polarizing element 111 is a polarizing element that generates linearly polarized light, or a linear polarizing element such as a polarizing filter including, for example, a wire grid. The rotation driving section 112 drives the polarizing element 111 on the basis of an instruction from the control section 20, and rotates the polarization direction of the polarizing element 111 by using the optical axial direction of incident light incident on the imaging section 13 as a rotation axis. A rotational position detecting section 113 detects the rotational position of the polarizing element 111, generates rotational position information indicating the detected rotational position, and outputs the generated rotational position information to the control section 20. Additionally, the polarizing element 111 may be rotated not only by the rotation driving section 112, but also by a hand.

The lens system block 12 includes a focus lens or a zoom lens, a diaphragm mechanism, and the like. Further, the lens system block 12 includes a driving section that drives the lens and the diaphragm mechanism on the basis of an instruction from the control section 20. The lens system block 12 controls the position of the focus lens or the zoom lens on the basis of an instruction from the control section 20, and forms an object optical image on the exposed surface of the imaging section 13. The lens system block 12 controls the opening degree of the diaphragm on the basis of an instruction from the control section 20, and adjusts the amount of object light. Additionally, the positions of the focus lens or the zoom lens, and the diaphragm may be mechanically movable by a user operation.

The imaging section 13 includes a complementary metal oxide semiconductor (CMOS) image sensor, charge coupled device (CCD) image sensor, or the like. Further, there are provided polarizing filters arranged on the incidence plane of the image sensor at predetermined intervals in a manner that pixels having a predetermined polarization direction are uniform on the screen. FIG. 2 exemplifies the configuration of the imaging section. FIG. 2 exemplifies a case where the imaging section 13 includes a polarizing filter 132 on the incidence plane of the image sensor 131. There are arranged pixels having a predetermined polarization direction on the polarizing filter 132 every other pixel in the horizontal direction and the vertical direction. The imaging section 13 outputs the generated image signal of a polarization pixel and the generated image signal of a non-polarization pixel to the image signal processing section 14. Additionally, pixels having a predetermined polarization direction (e.g., a polarization direction of "0°") are represented as polarization pixels CP, while pixels for non-polarized light are represented as non-polarization pixels CN.

The image signal processing section 14 performs various types of image processing such as a noise reduction process, a gain adjustment process, a deficient pixel correction process, a de-mosaic process, a color adjustment process, and a resolution conversion process on the image signal output from the imaging section 13. Further, the image signal processing section 14 generates an image signal of a captured image of the dynamic range corresponding to the rotational position of the polarization direction of incident light incident on the imaging section 13, for example, in a case where the sensitivity difference between the non-polarization pixels and the polarization pixels is greater than a threshold. In a case where the sensitivity difference is greater than the threshold, the image signal processing section 14 carries out a gain adjustment for the polarization pixels in accordance with the sensitivity of the polarization pixels of the imaging section 13, and makes an image combination by using the image signals that have been subjected to the gain adjustment. The image signal processing section 14 outputs the processed image signal to the display section 15 and the image saving section 16. Further, the image signal processing section 14 may generate information indicating an analysis result of the signal strength distribution of a non-polarization pixel group or the signal strength distribution of a polarization pixel group on the basis of the image signals output from the imaging section 13, or a histogram indicating, for example, the signal strength distribution for each color component or the signal strength distribution of luminance as image analysis information, and output the generated image analysis information to the display section 15. Additionally, the image signal processing section 14 superimposes a display signal on the image signal, and outputs the superimposed display signal to the display section 15 and the like on the basis of the control from the control section 20. Further, in a case where the image signal processing section 14 performs the operation of the sensitivity detecting section, the image signal processing section 14 computes the sensitivity of the polarization pixels, the sensitivity of the non-polarization pixels, or the sensitivity difference or the sensitivity ratio between the sensitivity of the polarization pixels and the sensitivity of the non-polarization pixels in the imaging section 13 on the basis of the image signals supplied from the imaging section 13. The sensitivity of the polarization pixels and the non-polarization pixels in the imaging section 13 means the sensitivity of the polarization pixels and the non-polarization pixels in the imaging section on which object light is incident via the polarization rotating section 11. The sensitivity of the polarization pixels varies in accordance with the relationship between the polarization direction of the polarization rotating section 11 and the polarization direction of the polarization pixels. The image signal processing section 14 computes the sensitivity and the sensitivity difference or the sensitivity ratio, for example, on the basis of the signal strength of the polarization pixels and the non-polarization pixels when an object that is so bright that pixel saturation is not reached is imaged via the polarization rotating section 11.

The display section 15 includes a liquid crystal display, an organic electro luminescence (EL) display, or the like. The display section 15 displays a captured image and various types of information on the screen. For example, the display section 15 displays a through image on the screen on the basis of image data output from the image signal processing section 14. Further, the display section 15 displays a reproduced image on the screen when an image recorded on the image saving section 16 is reproduced by the image signal processing section 14. Moreover, the display section 15 displays a menu and information.

The image saving section 16 stores image data output from the image signal processing section 14, and metadata (such as the date and time, or the like when the image data is acquired) relating to the image data. The image saving section 16 includes, for example, a semiconductor memory, an optical disc, a hard disk (HD), or the like. The image saving section 16 may also be fixed and provided in the imaging device 10, or provided to the imaging device 10 in an attachable and detachable manner.

The user interface section 17 includes a shutter button, an operation switch, a touch panel, or the like. The user interface section 17 generates the operation signal corresponding to a user operation on the shutter button, a polarizing filter rotating operation button, the variety of operation switches, the touch panel, or the like, and outputs the generated operation signal to the control section 20.

The control section 20 includes a central processing unit (CPU), a read only memory (ROM), a random access memory (RAM), and the like. The read only memory (ROM) stores a variety of programs that are executed by the central processing unit (CPU). The random access memory (RAM) stores information such as a variety of parameters. The CPU executes a variety of programs stored in the ROM, controls each section on the basis of an operation signal from the user interface section 17 in a manner that an imaging operation is performed in the imaging device 10 in the operation mode corresponding to a user operation.

In a case where the control section 20 performs the operation of the sensitivity detecting section, the control section 20 computes the difference in polarization direction (polarization direction different angle) with the polarizing element 111 of the polarizing element rotating section 11 and the polarizing filter 132 of the imaging section 13 on the basis of rotational position information from the polarizing element rotating section 11. Further, it is possible to compute the sensitivity of the polarization pixels, the sensitivity difference, or the sensitivity ratio on the basis of the rotational position information by computing, in advance, the sensitivity of the non-polarization pixels corresponding to the difference in polarization direction. The control section 20 determines whether to set a dynamic-range-oriented imaging mode or a resolution-oriented imaging mode, on the basis of the computed polarization direction different angle or the sensitivity difference between the polarization pixels and the non-polarization pixels computed by the image signal processing section 14. In a case where the polarization direction different angle or the sensitivity difference exceeds a threshold, the control section 20 determines that the dynamic-range-oriented imaging mode is set. In a case where it is determined that the dynamic-range-oriented imaging mode is set, the control section 20 causes the image signal processing section 14 to carry out a gain adjustment in accordance with the sensitivity of the polarization pixels and make an image combination by using the pixel signals that have been subjected to the gain adjustment and the pixel signals of the non-polarization pixels, and generate an image single of a captured image of a wide dynamic range. Further, in a case where the polarization direction different angle or the sensitivity difference is less than or equal to the threshold, the control section 20 determines that the resolution-oriented imaging mode is set, and causes the image signal processing section 14 to generate an image signal of a captured image having resolution that is not decreased, without carrying out the gain adjustment corresponding to the sensitivity of the non-polarization pixels or making an image combination. Additionally, as the threshold, the maximal value is set that, for example, accepts the influence caused by the sensitivity difference between the polarization pixels and the non-polarization pixels in a captured image.

<2. Operation of Imaging Device>

Next, the operation of the imaging device will be described. FIG. 3 is a flowchart illustrating the operation of the imaging device. In step ST1, the control section performs an imaging setting process. FIG. 4 is a flowchart illustrating the imaging setting process.

In step ST11, the control section acquires polarizing element state information. The control section 20 acquires rotational position information indicating the rotational position of the polarizing element 111 from the rotational position detecting section 113 of the polarization rotating section 11, or the sensitivity difference between the polarization pixels and the non-polarization pixels from the image signal processing section 14, and proceeds to step ST12.

In step ST12, the control section determines whether the sensitivity difference exceeds a threshold. In a case where the control section 20 acquires rotational position information, the control section 20 computes the polarization direction different angle indicating the difference of the polarization direction of the polarizing element 111 in the polarization rotating section 11 from the polarization direction of the polarizing filter 132 in the imaging section 13. Further, the control section 20 computes the sensitivity difference between the polarization pixels and the non-polarization pixels on the basis of the polarization direction different angle. In a case where the sensitivity difference computed on the basis of the rotational position information or the sensitivity difference acquired from the image signal processing section 14 exceeds a threshold, the control section 20 proceeds to step ST13. In a case where the sensitivity difference computed on the basis of the rotational position information or the sensitivity difference acquired from the image signal processing section 14 is less than or equal to the threshold, the control section 20 proceeds to step ST14.

In step ST13, the control section performs a dynamic-range-oriented imaging mode setting process. The control section 20 sets an exposure time or the like for the imaging section 13 in accordance with the luminance of an object. Further, the control section 20 performs gain control based on the sensitivity of the polarization pixels and the non-polarization pixels and makes an image combination by using the image signals that have been subjected to the gain adjustment. The control section 20 then sets the operation of the image signal processing section 14 to generate a wide dynamic range image. Additionally, the control section 20 also causes the image signal processing section 14 to perform various types of image processing such as a noise reduction process, a deficient pixel correction process, de-mosaic process, a color adjustment process, and a resolution conversion process, and proceeds to step ST2 of FIG. 3.

In step ST14, the control section performs a resolution-oriented imaging mode setting process. The control section 20 sets an exposure time or the like in accordance with the luminance of an object. Additionally, the control section 20 also causes the image signal processing section 14 to perform various types of image processing such as a noise reduction process, a deficient pixel correction process, de-mosaic process, a color adjustment process, and a resolution conversion process, and proceeds to step ST2 of FIG. 3.

In step ST2, the control section performs a through image display process. The control section 20 controls the imaging section 13 on the basis of the imaging setting in step ST1 and causes the imaging section 13 to generate an image signal. The control section 20 displays a through image on the display section 15, and proceeds to step ST3.

In step ST3, the control section determines whether imaging ends. In a case where the operation mode of the imaging device is not switched from the operation mode in which an object is imaged and a recorded image is saved to another operation mode, and in a case where an end operation is not performed to end the operation of the imaging device, the control section 20 determines that imaging does not end. The control section 20 then returns to step ST1. Further, in a case where an operation of switching the operation mode to another operation mode or an end operation is performed, the control section 20 ends the operation.

In a case where a shutter operation is performed while the control section is performing the processes from step ST1 to step ST3 illustrated in FIG. 3, the control section performs an interrupt process illustrated in FIG. 5. In step ST21, the control section performs a recorded image generating process. In a case where the imaging mode is the dynamic-range-oriented imaging mode, the control section 20 operates the imaging section 13 and the image signal processing section 14 in the imaging setting of the dynamic-range-oriented imaging mode setting process to generate an image signal of a wide dynamic range image. Further, in a case where the imaging mode is the resolution-oriented imaging mode, the control section 20 drives the imaging section 13 in the imaging setting of the resolution-oriented imaging mode setting process to generate an image signal of a polarized captured image. The control section 20 generates an image signal of a captured image having a wide dynamic range or resolution that is not decreased, and proceeds to step ST22. Additionally, the imaging operations of the dynamic-range-oriented imaging mode and the resolution-oriented imaging mode will be described below.

In step ST22, the control section performs an image saving process. The control section 20 outputs the image signal generated in step ST21 to the image signal processing section 14 and performs a variety of processes. The control section 20 causes the image saving section 16 to store the processed image signal, and ends the interrupt process.

<2-1. Dynamic-Range-Oriented Imaging Operation and Resolution-Oriented Imaging Operation>

Next, the dynamic-range-oriented imaging operation of the imaging device will be described. FIG. 6 illustrates a relationship between incident light, linearly polarized light passing through the polarizing element, and the imaging section. Once incident light LA is incident on the polarizing element 111, the polarizing element 111 transmits linearly polarized light LB, and makes the linearly polarized light LB be incident on the imaging section 13. Further, if the polarizing element 111 is rotated by using the optical direction of incident light incident on the imaging section 13 as a rotation axis, the polarization direction of the linearly polarized light LB varies. For example, in a case where a rotational angle $\theta$ of the polarizing element 111 is "$\theta=0°$" as illustrated in A of FIG. 6, the polarization direction of the linearly polarized light LB is equal to the polarization direction of a polarization pixel CP in the imaging section 13. Further, in a case where a rotational angle $\theta$ of the polarizing element 111 is "$\theta=45°$" as illustrated in B of FIG. 6, the polarization direction of the linearly polarized light LB has an angular difference from the polarization direction of a polarization pixel CP in the imaging section 13. Further, in a case where a rotational angle $\theta$ of the polarizing element 111 is "$\theta=90°$" as illustrated in C of FIG. 6, the polarization direction of the linearly polarized light LB is orthogonal to the polarization direction of a polarization pixel CP in the imaging section 13.

FIG. 7 exemplifies the relationship between the rotational angle of the polarizing element and the sensitivity of the polarization pixel in the imaging section. The polarizing element 111 is rotatable by using the optical axial direction of incident light incident on the imaging section 13 as a rotation axis as illustrated in FIG. 6. Here, in a case where the polarizing element 111 is rotated to vary the polarization direction, the sensitivity of the polarization pixel CP in the imaging section 13 varies in accordance with the rotational angle of the image sensor.

For example, the polarization pixel CP having a polarization direction of "0°" has the maximal sensitivity (e.g., 0.5) in a case where the rotational angle $\theta$ of the polarizing element 111 is "$\theta=0°$." Afterwards, the sensitivity of the polarization pixel CP decreases with the rotation of the polarization direction of the polarizing element 111. In a case where the rotational angle $\theta$ of the polarizing element 111 is "$\theta=90°$," the polarization pixel CP has the minimal sensitivity (e.g., 0). Moreover, once the polarization direction of the polarizing element 111 is rotated, the sensitivity increases with the rotation. In a case where the rotational angle $\theta$ of the polarizing element 111 is "$\theta=180°$," the maximal sensitivity (e.g., 0.5) is obtained.

The control section 20 sets the gain of the polarization pixel CP on the basis of the sensitivity ratio between a non-polarization pixel CN and the polarization pixel CP, and outputs the set gain to the image signal processing section 14. For example, in a case where the sensitivity of the non-polarization pixel CN is "0.5" and the sensitivity of the polarization pixel CP is "SE," the sensitivity ratio "0.5/SE" is set as a gain GAnp of the polarization pixel CP and output to the image signal processing section 14. Additionally, the sensitivity and the sensitivity ratio may be computed by the image signal processing section 14 as described above.

The image signal processing section 14 carries out a gain adjustment by using the set gain, and makes an image combination after the gain adjustment. FIG. 8 is a diagram for describing a gain adjustment and an image combination. A of FIG. 8 exemplifies the signal strength of a polarization pixel with respect to incident light. For example, in a case where incident light has luminance LR1, the non-polarization pixel CN is saturated at signal strength IMsat. Further, in a case where incident light has luminance LR2 higher than the luminance LR1, the polarization pixel CP is saturated at the signal strength IMsat. In a case where the non-polarization pixel CN is saturated, the image signal processing section 14 amplifies a pixel signal of the polarization pixel CP with the gain GAnp corresponding to the sensitivity as illustrated in B of FIG. 8 to make an image combination. The image signal processing section 14 can hereby generate an image signal of a wide dynamic range with no saturation even in a case where incident light has luminance higher than luminance LR1. Additionally, it can be determined whether incident light has luminance higher than or equal to the luminance LR1, on the basis of the signal level of an image signal from the imaging section 13.

Further, the image signal processing section 14 may set the combination ratio in accordance with incident light (the signal level of an image signal from the imaging section 13) to make an image combination in a manner that an image based on the non-polarization pixel CN inconspicuously switches to an image subjected to a gain adjustment for the polarization pixel CP. FIG. 9 exemplifies the relationship between incident light and the combination ratio. The image signal processing section 14 adjusts the combination ratio before the non-polarization pixel CN has the luminance LR1 with which the non-polarization pixel CN is saturated. When the non-polarization pixel CN has the luminance LR1 with which the non-polarization pixel CN is saturated, the combination ratio is set in a manner that an image based on the non-polarization pixel CN is completely switched to an image subjected to a gain adjustment for the polarization pixel CP.

FIG. 10 illustrates a specific example of the imaging section. The imaging section 13 includes a mosaic color filter and the polarizing filter 132 on the incidence plane side of the imaging section. The mosaic color filter adopts the Bayer arrangement as its color arrangement by using 2×2 pixels as a color unit. The polarizing filter 132 includes polarization pixels in the horizontal direction and the vertical direction every other pixel.

FIG. 11 illustrates an operation example of the image signal processing section. The image signal processing section 14 divides the imaging section illustrated in A of FIG. 11 into the non-polarization pixel group illustrated in B of FIG. 11 and the polarization pixel group illustrated in C of FIG. 11. The image signal processing section 14 uses pixel signals of the non-polarization pixel group to interpolate pixels and perform a de-mosaic process. As illustrated in D of FIG. 11, the image signal processing section 14 generates an image signal of a captured image (which will be referred to as "non-polarization pixel group image") for each color component. Further, the image signal processing section 14 uses pixel signals of the polarization pixels to interpolate pixels and perform a de-mosaic process. As illustrated in E of FIG. 11, the image signal processing section 14 generates an image signal of a captured image (which will be referred to as "polarization pixel group image") for each color component. Additionally, the sensitivity of the polarization pixel group image is less than or equal to the sensitivity of the non-polarization pixel group image. The image signal processing section 14 determines for each pixel of the non-polarization pixel group image whether the image signal is saturated. In a case where an image signal of the non-polarization pixel group image is saturated, the image signal processing section 14 uses the image signal at the corresponding pixel position in the polarization pixel group image amplified with the gain corresponding to the sensitivity ratio to make an image combination at the combination ratio corresponding to incident light (image signal of the non-polarization pixel) and generate, for each color component, an image signal that is illustrated in F of FIG. 11 and has a wide dynamic range.

Since the sensitivity difference between the polarization pixel and the non-polarization pixel falls within the acceptable range, the image signal processing section 14 uses a pixel signal of each pixel to interpolate pixels and perform a de-mosaic process without dividing the imaging section into the non-polarization pixel group and the polarization pixel group in the resolution-oriented imaging operation, and generates an image signal for each color component without degrading the resolution.

The imaging device 10 performs such a process, and can then generate a dynamic-range-oriented captured image or a resolution-oriented captured image simply by rotating the polarizing element 111. Further, in a case where a dynamic-range-oriented captured image is generated, it is possible to generate captured images which have the equal exposure time, but are different in sensitivity. Accordingly, even in a case where a dark moving object is imaged, it is possible to generate a wide dynamic range image that is not blurred by the movement. Moreover, it is possible to adjust the sensitivity of the polarization pixel by rotating the polarizing element 111. Accordingly, it is possible to generate an image of a desired dynamic range simply by adjusting how much the polarizing element 111 is rotated in the dynamic-range-oriented imaging mode. Further, it is also possible to generate a captured image having resolution that is not decreased.

<2-2. Imaging Operation Examples>

Next, imaging operation examples will be described. FIGS. 12 to 17 each exemplify a display screen of the display section. The display screen has an image display area 151, a non-polarization pixel group histogram display area 152, a polarization pixel group histogram display area 153, and a user interface display area 154.

For example, a through image or a recorded image is displayed on the image display area 151 on the basis of an image signal output from the image signal processing section 14. The signal strength histogram of the non-polarization pixels are displayed on the non-polarization pixel group histogram display area 152 on the basis of image analysis information generated by the image signal processing section 14. The histogram of the signal strength of the polarization pixels are displayed on the polarization pixel group histogram display area 153 on the basis of image analysis information generated by the image signal processing section 14. Additionally, a histogram may also be displayed for each color component, or a luminance histogram may be displayed. The user interface display area 154 has a slider 154a for setting the rotational position of the polarizing element 111 and a slider 154b for setting the ISO speed. Additionally, the rotational position or the ISO speed of the polarizing element 111 may also be set by using a dial or the like instead of the sliders.

FIG. 12 exemplifies a case where the rotational angle is set at "0°" and imaging is performed in the resolution-oriented imaging mode. The captured image displayed on the image display area 151 is an image that is not saturated, but has appropriate exposure as shown in the displayed histograms.

FIG. 13 exemplifies a case where an object image is saturated with the rotational angle set at "0°" and all the pixels equal in sensitivity. For example, in a case the sky is very bright, the polarization pixels and the non-polarization pixels in the sky area are saturated, and the histograms show high degrees at high signal strength grade. In such a case, the polarizing element 111 is rotated to enlarge the dynamic range. FIG. 14 illustrates a case where the polarizing element 111 is rotated to enlarge the dynamic range. The rotation of the polarizing element 111 decreases the sensitivity of the polarization pixels. Additionally, the decreased sensitivity of the polarization pixels lowers the degree at high signal strength grade in the histogram of the polarization pixel group. In this way, if the polarizing element 111 is rotated and the sensitivity of the imaging polarization pixels is decreased, the imaging mode switches to the dynamic-range-oriented imaging mode. In this case, the image signal processing section 14 combines an image based on the non-polarization pixels with an image that is based on the polarization pixels and has been subjected to a gain adjustment in accordance with the sensitivity of the polarization pixels. The image displayed on the image display area 151 is a captured image that is not saturated, but has a wide dynamic range.

FIG. 15 exemplifies a case where an object is dark and blocked up shadows occur with the rotational angle set at "0°" and all the pixels equal in sensitivity. For example, the shade is dark, the polarization pixels and the non-polarization pixels in the shade area have the lowest signal strength, and the histograms show high degrees at low signal strength grade. In such a case, increasing the ISO speed can make a captured image brighter as illustrated in FIG. 16. Increasing the ISO speed, however, saturates the polarization pixels and the non-polarization pixels, for example, in the sky area in some cases. Additionally, increasing the ISO speed causes the histograms to show higher degrees at high signal strength grade.

Here, the rotation of the polarizing element 111 decreases the sensitivity of the polarization pixels. FIG. 17 illustrates a case where the polarizing element 111 is rotated from the polarization element 111 illustrated in FIG. 16 to enlarge the dynamic range. Additionally, the decreased sensitivity of the polarization pixels lowers the degree at high signal strength grade in the histogram of the polarization pixel group. In this way, if the polarizing element 111 is rotated and the sensitivity of the polarization pixels is decreased, the imaging mode switches to the dynamic-range-oriented imaging mode. In this case, the image signal processing section 14 combines an image based on the non-polarization pixels with an image that is based on the polarization pixels and has been subjected to a gain adjustment in accordance with the sensitivity of the polarization pixels. The image displayed on the image display area 151 is a captured image that is not saturated, but has a wide dynamic range.

A user can generate a dynamic-range-oriented captured image or a resolution-oriented captured image simply by rotating the polarizing element 111 in this way. Further, it is possible to adjust the sensitivity of the polarization pixel by rotating the polarizing element 111. Accordingly, it is possible to generate an image of a desired dynamic range simply by adjusting how much the polarizing element 111 is rotated in the dynamic-range-oriented imaging mode. Further, since the display section 15 displays the user interface image, it is possible to vary the polarization direction of incident light incident on the imaging section 13 on the screen. Further, displaying the non-polarization pixel group histogram makes it possible to check on the screen whether the pixels are saturated and the dynamic range has to be enlarged. Moreover, displaying the polarization pixel group histogram makes it possible to check on the screen whether the dynamic range is optimally enlarged. For example, in a case where the polarization pixel group histogram shows a high degree at the highest signal strength grade, it can be determined that the dynamic range is insufficiently enlarged. In a case where the degree is high at the lowest signal strength grade or in a case where both degrees at high grade are 0, it can be determined that the dynamic range is excessively enlarged.

Additionally, the display screens of FIGS. 12 to 17 are each an example. For example, the polarization direction of incident light or the enlarged dynamic range may be displayed in the form of a numeric value or a diagram. Further, since the rotation of the polarizing element 111 varies the histogram of the polarization pixel group, the histogram of the polarization pixel group alone may be displayed.

<3. Another Configuration of Imaging Device>

In the above-described embodiment, the configuration is exemplified in which the polarization rotating section 11 is provided on the incidence plane side of the lens system block 12. However, the polarization rotating section 11 only has to be provided at a position on the incidence plane side of the imaging section 13. FIG. 18 exemplifies another configuration of the imaging device. An imaging device 10a includes the polarization rotating section 11 between the lens system block 12 and the imaging section 13.

Further, the configuration of the imaging section is not limited to a case where polarization pixels are obliquely provided within a color unit of 2×2 pixels as illustrated in FIG. 10. FIG. 19 exemplifies another configuration of the imaging section. A of FIG. 19 illustrates a case where polarization pixels are provided within a color unit of 2×2 pixels in the horizontal direction. Further, B of FIG. 19 exemplifies a case where the imaging section 13 has a color unit of one pixel, two pixels in the vertical direction are polarization pixels, polarization pixel blocks each made of these two pixels are arranged every other pixel in the horizontal direction and every two pixels in the vertical direction. In this way, if a unit of one pixel is adopted as a color component unit, it is possible to more uniformly arrange color component pixels and improve the image quality as compared with a color component unit of 2×2 pixels.

Further, the polarizing element 111 in the polarization rotating section 11 does not have to be rotated by a user operation, but may also be automatically rotated in accordance with a pixel signal generated by the imaging section 13. For example, image analysis information generated by the image signal processing section 14 may be output to the control section 20, and the control section 20 may rotate the polarizing element 111 on the basis of the polarization pixel group histogram in a manner that the polarization pixels are not saturated. In this case, it is possible to automatically adjust the dynamic range in accordance with an object within the imaging range in a manner that saturation is not reached.

Further, the polarization rotating section 11 does not have to include the polarizing element 111 or the rotation driving section 112, but may also use the technology of a polarization rotating element or the like that uses a liquid crystal element as disclosed in JP H10-268249A. For example, there is provided a polarizing element on the incidence plane side of the imaging section. The polarizing element transmits only a specific polarized wave of incident light. The polarized light passing through this polarizing element is rotated by a polarization rotating section that uses a liquid crystal element. Such a configuration eliminates any mechanism that rotates the polarizing element 111, and facilitates the polarization direction to rotate.

<4. Application>

The technology according to an embodiment of the present disclosure is applicable to a variety of products. For example, the technology according to an embodiment of the present disclosure is implemented not only as information processing terminals, but also as devices mounted on any type of mobile objects such as automobiles, electric vehicles, hybrid electric vehicles, motorcycles, bicycles, personal mobilities, airplanes, drones, ships, robots, construction machines, and agricultural machines (tractors).

FIG. 20 is a block diagram illustrating a schematic configuration example of a vehicle control system 7000 that is an example of a mobile object control system to which the technology according to an embodiment of the present disclosure can be applied. The vehicle control system 7000 includes electronic control units connected via a communication network 7010. In the example illustrated in FIG. 20, the vehicle control system 7000 includes a drive line control unit 7100, a body system control unit 7200, a battery control unit 7300, a vehicle outside information detecting unit 7400, a vehicle inside information detecting unit 7500, and an integrated control unit 7600. The communication network 7010, which connects these control units, may be an in-vehicle communication network such as a controller area network (CAN), a local interconnect network (LIN), a local area network (LAN), or FlexRay (registered trademark) that is compliant with any standard.

Each control unit includes a microcomputer that performs operation processing in accordance with a variety of programs, a storage section that stores the programs, parameters used for the variety of operations, or the like executed by the microcomputer, and a driving circuit that drives devices subjected to various types of control. Each control unit includes a network I/F used to communicate with the other control units via the communication network 7010, and a communication I/F used to communicate with devices, sensors, or the like outside and inside the vehicle through wired communication or wireless communication. FIG. 20 illustrates a microcomputer 7610, a general-purpose communication I/F 7620, a dedicated communication I/F 7630, a positioning section 7640, a beacon receiving section 7650, an onboard device I/F 7660, an audio and image output section 7670, an in-vehicle network I/F 7680, and a storage section 7690 as the functional configuration of the integrated control unit 7600. Each of the other control units similarly includes a microcomputer, a communication I/F, a storage section, and the like.

The drive line control unit 7100 controls the operation of devices related to the drive line of the vehicle in accordance with a variety of programs. For example, the drive line control unit 7100 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like. The drive line control unit 7100 may have the function of a control device for an antilock brake system (ABS) or an electronic stability control (ESC).

The drive line control unit 7100 is connected to a vehicle state detecting section 7110. The vehicle state detecting section 7110 includes, for example, at least one of sensors such as a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 7100 uses a signal input from the vehicle state detecting section 7110 to perform operation processing, and controls the internal combustion engine, the driving motors, the electric power steering device, the braking device, or the like.

The body system control unit 7200 controls the operations of a variety of devices attached to the vehicle body in accordance with a variety of programs. For example, the body system control unit 7200 functions as a control device for a keyless entry system, a smart key system, a power window device, or a variety of lights such as a headlight, a backup light, a brake light, a blinker, or a fog lamp. In this case, the body system control unit 7200 can receive radio waves transmitted from a portable device that serves instead of the key or signals of a variety of switches. The body system control unit 7200 receives these radio waves or signals, and controls the vehicle door lock device, the power window device, the lights, or the like.

The battery control unit 7300 controls a secondary battery 7310 in accordance with a variety of programs. The secondary battery 7310 serves as a power supply source of a driving motor. For example, the battery control unit 7300 receives information such as the battery temperature, the battery output voltage, or the remaining battery capacity from a battery device including the secondary battery 7310. The battery control unit 7300 uses these signals to perform operation processing, and performs temperature adjusting control on the secondary battery 7310 or controls a cooling device or the like included in the battery device.

The vehicle outside information detecting unit 7400 detects information on the outside of the vehicle including the vehicle control system 7000. For example, the vehicle outside information detecting unit 7400 is connected to at least one of an imaging section 7410 and a vehicle outside information detecting section 7420. The imaging section 7410 includes at least one of a time of flight (ToF) camera, a stereo camera, a monocular camera, an infrared camera, and other cameras. The vehicle outside information detecting section 7420 includes, for example, at least one of an environment sensor that detects the current weather, and a surrounding information detecting sensor that detects another vehicle, an obstacle, a pedestrian, or the like around the vehicle including the vehicle control system 7000.

The environment sensor may be, for example, at least one of a raindrop sensor that detects rainy weather, a fog sensor that detects a fog, a sunshine sensor that detects the degree of sunshine, a snow sensor that detects a snowfall. The surrounding information detecting sensor may be at least one of an ultrasonic sensor, a radar device, and a light detection and ranging/laser imaging detection and ranging (LIDAR) device. These imaging section 7410 and vehicle outside information detecting section 7420 may be installed as independent sensors or devices, or as a device into which sensors and devices are integrated.

FIG. 21 illustrates an example of installation positions of the imaging section 7410 and the vehicle outside information detecting section 7420. Imaging sections 7910, 7912, 7914, 7916, and 7918 are positioned, for example, at at least one of the front nose, a side mirror, the rear bumper, the back door, and the upper part of the windshield in the vehicle compartment of a vehicle 7900. The imaging section 7910 attached to the front nose and the imaging section 7918 attached to the upper part of the windshield in the vehicle compartment chiefly acquire images of the area ahead of the vehicle 7900. The imaging sections 7912 and 7914 attached to the side mirrors chiefly acquire images of the areas on the sides of the vehicle 7900. The imaging section 7916 attached to the rear bumper or the back door chiefly acquires images of the area behind the vehicle 7900. The imaging section 7918 attached to the upper part of the windshield in the vehicle compartment is used chiefly to detect a preceding vehicle, a pedestrian, an obstacle, a traffic light, a traffic sign, a lane, or the like.

Additionally, FIG. 21 illustrates an example of the respective imaging ranges of the imaging sections 7910, 7912, 7914, and 7916. An imaging range a represents the imaging range of the imaging section 7910 attached to the front nose. Imaging ranges b and c respectively represent the imaging ranges of the imaging sections 7912 and 7914 attached to the side mirrors. An imaging range d represents the imaging range of the imaging section 7916 attached to the rear bumper or the back door. For example, overlaying image data captured by the imaging sections 7910, 7912, 7914, and 7916 offers an overhead image that looks down on the vehicle 7900.

Vehicle outside information detecting sections 7920, 7922, 7924, 7926, 7928, and 7930 attached to the front, the rear, the sides, the corners, and the upper part of the windshield in the vehicle compartment of the vehicle 7900 may be, for example, ultrasonic sensors or radar devices. The vehicle outside information detecting sections 7920, 7926, and 7930 attached to the front nose, the rear bumper, the back door, and the upper part of the windshield in the vehicle compartment of the vehicle 7900 may be, for example, LIDAR devices. These vehicle outside information detecting sections 7920 to 7930 are used chiefly to detect a preceding vehicle, a pedestrian, an obstacle, or the like.

The description will continue with reference to FIG. 20 again. The vehicle outside information detecting unit 7400 causes the imaging section 7410 to capture images of the outside of the vehicle, and receives the captured image data. Further, the vehicle outside information detecting unit 7400 receives detection information from the connected vehicle outside information detecting section 7420. In a case where the vehicle outside information detecting section 7420 is an ultrasonic sensor, a radar device, or a LIDAR device, the vehicle outside information detecting unit 7400 causes ultrasound, radio waves, or the like to be transmitted, and receives the information of the received reflected waves. The vehicle outside information detecting unit 7400 may perform a process of detecting an object such as a person, a car, an obstacle, a traffic sign, or a letter on a road, or a process of detecting the distance on the basis of the received information. The vehicle outside information detecting unit 7400 may perform an environment recognition process of recognizing a rainfall, a fog, a road condition, or the like on the basis of the received information. The vehicle outside information detecting unit 7400 may compute the distance to an object outside the vehicle on the basis of the received information.

Further, the vehicle outside information detecting unit 7400 may perform an image recognition process of recognizing a person, a car, an obstacle, a traffic sign, a letter on a road, or the like, or a process of detecting the distance on the basis of the received image data. The vehicle outside information detecting unit 7400 may perform a distortion correcting process, a positioning process, or the like on the received image data, and combine image data captured by a different imaging section 7410 to generate an overhead view or a panoramic image. The vehicle outside information detecting unit 7400 may use the image data captured by the other imaging section 7410 to perform a viewpoint converting process.

The vehicle inside information detecting unit 7500 detects information on the inside of the vehicle. The vehicle inside information detecting unit 7500 is connected, for example, to a driver state detecting section 7510 that detects the state of the driver. The driver state detecting section 7510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 7500 may compute the degree of the driver's tiredness or the degree of the driver's concentration or determine whether the driver have a doze, on the basis of detection information input from the driver state detecting section 7510. The vehicle inside information detecting unit 7500 may perform a process such as a noise cancelling process on the picked-up audio signal.

The integrated control unit 7600 controls the overall operation inside the vehicle control system 7000 in accordance with a variety of programs. The integrated control unit 7600 is connected to an input section 7800. The input section 7800 is implemented as a device such as a touch panel, a button, a microphone, a switch, or a lever on which a passenger can perform an input operation. The integrated control unit 7600 may receive data obtained by recognizing the voice input through the microphone. The input section 7800 may be, for example, a remote control device that uses infrared light or other radio waves, or an external connection device such as a mobile telephone or a personal digital assistant (PDA) corresponding to the operation of the vehicle control system 7000. The input section 7800 may be, for example, a camera. In that case, a passenger can input information through gesture. Alternatively, data may be input that is obtained by detecting the movement of a wearable device worn by a passenger. Moreover, the input section 7800 may include an input control circuit or the like that generates an input signal, for example, on the basis of information input by a passenger or the like using the above-described input section 7800, and outputs the generated input signal to the integrated control unit 7600. The passenger or the like operates this input section 7800, thereby inputting various types of data to the vehicle control system 7000 or instructing the vehicle control system 7000 about a processing operation.

The storage section 7690 may include a read only memory (ROM) that stores a variety of programs to be executed by a microcomputer, and a random access memory (RAM) that stores a variety of parameters, operation results, sensor values, or the like. Further, the storage section 7690 may be implemented as a magnetic storage device such as a hard disk drive (HDD), a semiconductor storage device, an optical storage device, a magneto-optical storage device, or the like.

The general-purpose communication I/F 7620 is a general-purpose communication I/F that mediates in communication between a variety of devices in an external environment 7750. The general-purpose communication I/F 7620 may implement a cellular communication protocol such as Global System of Mobile communications (GSM), WiMAX, Long Term Evolution (LTE) or LTE-Advanced (LTE-A), or other wireless communication protocols such as a wireless LAN (which is also referred to as Wi-Fi (registered trademark)) or Bluetooth (registered trademark). The general-purpose communication I/F 7620 may be connected to a device (such as an application server or a control server) on an external network (such as the Internet, a cloud network, or a network specific to a service provider), for example, via a base station or an access point. Further, the general-purpose communication I/F 7620 may be connected to a terminal (such as a terminal of the driver, a pedestrian or a store, or a machine type communication (MTC) terminal) in the vicinity of the vehicle, for example, using the peer-to-peer (P2P) technology.

The dedicated communication I/F 7630 is a communication I/F that supports a communication protocol defined for the purpose of use for vehicles. The dedicated communication I/F 7630 may implement a standard protocol such as wireless access in vehicle environment (WAVE), which is a combination of IEEE 802.11p for the lower layer and IEEE 1609 for the upper layer, dedicated short range communications (DSRC), or a cellular communication protocol. The dedicated communication I/F 7630 typically performs V2X communication. The V2X communication is a concept including one or more of vehicle-to-vehicle communication, vehicle-to-infrastructure communication, vehicle-to-home communication, and vehicle-to-pedestrian communication.

The positioning section 7640 receives, for example, global navigation satellite system (GNSS) signals (such as global positioning system (GPS) signals from a GPS satellite) from a GNSS satellite for positioning, and generates position information including the latitude, longitude, and altitude of the vehicle. Additionally, the positioning section 7640 may also identify the present position by exchanging signals with a wireless access point, or acquire position information from a terminal such as a mobile phone, a PHS, or a smartphone that has a positioning function.

The beacon receiving section 7650 receives radio waves or electromagnetic waves, for example, from a wireless station or the like installed on the road, and acquires information such as the present position, traffic congestion, closed roads, or necessary time. Additionally, the function of the beacon receiving section 7650 may be included in the above-described dedicated communication I/F 7630.

The onboard device I/F 7660 is a communication interface that mediates in connections between the microcomputer 7610 and a variety of onboard devices 7760 in the vehicle. The onboard device I/F 7660 may use a wireless communication protocol such as a wireless LAN, Bluetooth (registered trademark), near field communication (NFC), or a wireless USB (WUSB) to establish a wireless connection. Further, the onboard device I/F 7660 may also establish a wired connection such as a universal serial bus (USB), a high-definition multimedia interface (HDMI), or a mobile high-definition link (MHL) via a connection terminal (not illustrated) (and a cable if necessary). The onboard devices 7760 may include, for example, at least one of a mobile device of a passenger, a wearable device of a passenger, and an information device carried into or attached to the vehicle. Further, the onboard devices 7760 may also include a navigation device that searches for routes to any destination. The onboard device I/F 7660 exchanges control signals or data signals with these onboard devices 7760.

The in-vehicle network I/F 7680 is an interface that mediates in communication between the microcomputer 7610 and the communication network 7010. The in-vehicle network I/F 7680 transmits and receives signals or the like in compliance with a predetermined protocol supported by the communication network 7010.

The microcomputer 7610 of the integrated control unit 7600 controls the vehicle control system 7000 in accordance with a variety of programs on the basis of information acquired via at least one of the general-purpose communication I/F 7620, the dedicated communication I/F 7630, the positioning section 7640, the beacon receiving section 7650, the onboard device I/F 7660, and the in-vehicle network I/F 7680. For example, the microcomputer 7610 may calculate a control target value of the driving force generating device, the steering mechanism, or the braking device on the basis of acquired information on the inside and outside of the vehicle, and output a control instruction to the drive line control unit 7100. For example, the microcomputer 7610 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like. Further, the microcomputer 7610 may control the driving force generating device, the steering mechanism, the braking device, or the like on the basis of acquired information on the areas around the vehicle, thereby performing cooperative control for the purpose of automatic driving or the like that allows the vehicle to autonomously travel irrespective of any operation of a driver.

The microcomputer 7610 may generate three-dimensional distance information on the distance between the vehicle and an object such as a nearby structure or person on the basis of information acquired via at least one of the general-purpose communication I/F 7620, the dedicated communication I/F 7630, the positioning section 7640, the beacon receiving section 7650, the onboard device I/F 7660, and the in-vehicle network I/F 7680, and create local map information including surrounding information on the present position of the vehicle. Further, the microcomputer 7610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The audio and image output section 7670 transmits an output signal of at least one of a sound and an image to an output device capable of visually or aurally notifying a passenger of the vehicle or the outside of the vehicle of information. In the example of FIG. 20, an audio speaker 7710, a display section 7720, and an instrument panel 7730 are exemplified as the output device. For example, the display section 7720 may include at least one of an onboard display and a head-up display. The display section 7720 may have an augmented reality (AR) display function. The output device may also be a device other than these devices like a headphone, a wearable device such as a glasses-type display worn by a passenger, a projector, or a lamp. In a case where the output device is a display device, the display device visually displays a result obtained by the microcomputer 7610 performing a variety of processes or information received from another control unit in a variety of forms such as text, images, tables, or graphs. Further, in a case where the output device is an audio output device, the audio output device converts audio signals including reproduced audio data, acoustic data, or the like into analog signals, and aurally outputs the analog signals.

Additionally, in the example illustrated in FIG. 20, at least two control units connected via the communication network 7010 may be integrated into a single control unit. Alternatively, the individual control units may be configured as control units. Moreover, the vehicle control system 7000 may also include another control unit that is not illustrated. Further, a part or the whole of the functions executed by any of the control units may be executed by another control unit in the above description. That is, as long as information is transmitted and received via the communication network 7010, predetermined operation processing may be performed by any of the control units. Similarly, a sensor or a device connected to any of the control units may be connected to another control unit, and the control units may transmit and receive detection information to and from each other via the communication network 7010.

The imaging section illustrated in FIG. 1 is applied to the imaging sections 7410, 7910, 7912, 7914, 7916, and 7918 or any of these imaging sections in the above-described vehicle control system 7000, and the polarization rotating section is provided to the imaging section. Further, the image signal processing section 14 and the control section 20 are provided to the integrated control unit 7600 in the application illustrated in FIG. 20. Such a configuration makes it possible to acquire a dynamic-range-oriented captured image or a resolution-oriented captured image. Accordingly, the acquired captured image can be used for driving assist, driving control, or the like.

The imaging sections 7410, 7910, 7912, 7914, 7916, and 7918 are each configured to use imaging sections including, for example, the imaging section 13 illustrated in FIG. 2 in the above-described vehicle control system 7000. Further, the image signal processing section 14 is provided to the integrated control unit 7600 in the application illustrated in FIG. 29. Such a configuration makes it possible to acquire a high-performance captured image even if the imaging sections 7410, 7910, 7912, 7914, 7916, and 7918 are made smaller and thinner. Accordingly, the acquired captured image can be used for driving assist, driving control, or the like. Additionally, the image signal processing section 14 may be implemented in a module (such as an integrated circuit module including one die) for the integrated control unit 7600 illustrated in FIG. 29.

A series of processing described herein can be executed by hardware, software, or the combination thereof. In a case of executing the processing by the software, the processing can be executed by installing the program in which the processing sequence is recorded in the memory of the computer embedded in the dedicated hardware, or can be executed by installing the program in the general-purpose computer that can execute various processing.

For example, the program can be recorded on a hard disk, a solid state drive (SSD) or read only memory (ROM) as a recording medium in advance. Alternatively, the program can be temporarily or permanently stored (recorded) in (on) a removable recording medium such as a flexible disk, a compact disc read only memory (CD-ROM), Magneto Optical (MO) disk, a digital versatile disc (DVD), a Blu-Ray Disc (registered trademark) (BD), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

It should be understood by those skilled in the art that various modifications, combinations, sub-combinations and alterations may occur depending on design requirements and other factors insofar as they are within the scope of the appended claims or the equivalents thereof.

Additionally, the imaging device according to an embodiment of the present technology may also be configured as below.

(1)

An imaging device including:

an imaging section including pixels that generate pixel signals on the basis of incident light, the pixels including a polarization pixel having a predetermined polarization direction and a non-polarization pixel; and a polarization rotating section provided on an incidence plane side of the imaging section, and configured to rotate a polarization direction of the incident light.

(2)

The imaging device according to (1), further including:

an image signal processing section configured to generate an image signal of a captured image of a dynamic range corresponding to a rotational position of the polarization direction of the incident light.

(3)

The imaging device according to (2), further including:

a sensitivity detecting section configured to detect sensitivity of the polarization pixel whose sensitivity varies in accordance with a difference between the polarization direction of the incident light and the predetermined polarization direction, in which in a case where a sensitivity difference between the non-polarization pixel and the polarization pixel is greater than a threshold, the image signal processing section generates the image signal of the captured image of the dynamic range corresponding to the rotational position of the polarization direction of the incident light.

(4)

The imaging device according to (3), in which the image signal processing section varies the dynamic range in accordance with the sensitivity detected by the sensitivity detecting section.

(5)

The imaging device according to (4), in which the image signal processing section carries out a gain adjustment for the polarization pixel on the basis of the sensitivity detected by the sensitivity detecting section, makes an image combination by using an image signal which has been subjected to the gain adjustment, and generates the image signal of the dynamic range corresponding to the sensitivity.

(6)

The imaging device according to (5), in which in a case where the non-polarization pixel is saturated in the image combination, the image signal processing section switches an image signal of a captured image generated by using the non-polarization pixel to an image signal of a captured image generated by using a polarization pixel having lower sensitivity than the sensitivity of the non-polarization pixel.

(7)

The imaging device according to (6), in which the image signal processing section controls a combination ratio between an image signal of a captured image generated by using the non-polarization pixel and an image signal of a captured image generated by using the polarization pixel in accordance with the incident light, and switches the image signal of the captured image generated by using the non-polarization pixel to the image signal of the captured image generated by using the polarization pixel.

(8)

The imaging device according to any one of (3) to (7), in which in a case where the sensitivity difference between the non-polarization pixel and the polarization pixel is less than or equal to the threshold, the image signal processing section generates, on the basis of a pixel signal of each pixel, an image signal of a captured image indicating an image of a corresponding pixel.

(9)

The imaging device according to any one of (3) to (8), in which the sensitivity detecting section computes the sensitivity of the polarization pixel on the basis of the rotational position of the polarization direction of the incident light.

(10)

The imaging device according to any one of (3) to (8), in which the sensitivity detecting section computes the sensitivity of the polarization pixel on the basis of a pixel signal generated by the polarization pixel.

(11)

The imaging device according to any one of (2) to (10), further including:

a display section, in which the display section displays the captured image and a user interface image for an operation of rotating the polarization direction of the incident light.

(12)

The imaging device according to (11), in which the display section displays an image indicating a signal strength distribution for the polarization pixel or the non-polarization pixel.

(13)

The imaging device according to any one of (1) to (12), further including:

a control section configured to control the polarization rotating section, in which the control section rotates the polarization direction of the incident light in a manner that signal strength of the non-polarization pixel is not saturated.

(14)

The imaging device according to any one of (1) to (13), in which the polarization rotating section includes a polarizing element and a mechanism, the polarizing element being provided on the incidence plane side of the imaging section and transmitting only a specific polarized wave of the incident light, the mechanism rotating the polarizing element at any angle.

INDUSTRIAL APPLICABILITY

The imaging device and the imaging method according to an embodiment of the present technology make incident light be incident on the imaging section. The imaging section includes pixels that generate pixel signals on the basis of the incident light. The pixels include polarization pixels having a predetermined polarization direction and non-polarization pixels. The polarization direction of the incident light is rotated by the polarization rotating section provided on the incidence plane side of the imaging section. The polarization pixels therefore have the sensitivity corresponding to the polarization direction of the incident light, and it is possible to perform wide dynamic range imaging. It is possible to generate a wide dynamic range captured image that is unlikely to have motion blurring, by carrying out a gain adjustment on the basis of the sensitivity of the polarization pixels and making an image combination using the image signals that have been subjected to the gain adjustment. Further, the polarization rotating section rotates the polarization direction, thereby making it possible to vary the dynamic range. The imaging device and the imaging method according to an embodiment of the present technology are thus suitable for a device that performs various types of control on the basis of a captured image which has a wide dynamic range and is unlikely to have motion blurring.

REFERENCE SIGNS LIST 10, 10a imaging device
11 polarization rotating section
12 lens system block
13 imaging section
14 image signal processing section
15 display section
16 image saving section
17 user interface section
20 control section
111 polarizing element
112 rotation driving section
113 rotational position detecting section
131 image sensor
132 polarizing filter
151 image display area
152 non-polarization pixel group histogram display area
153 polarization pixel group histogram display area
154 user interface display area
154a, 154b slider

The invention claimed is:

1. An imaging device comprising:
an imager including
a plurality of first pixels arranged in an array, respective ones of the plurality of first pixels including a polarizing filter having a predetermined polarization direction with respect to a plane of the array, and
a plurality of second pixels, respective ones of the plurality of second pixels not including any polarizing filter;
a polarizing element provided on an incidence plane side of the imager; and
control circuitry configured to detect a change in a polarization direction of intermediate light between the imager and the polarizing element, in a case where the polarizing element is rotated with respect to the imager.

2. The imaging device according to claim 1, further comprising:
image signal processing circuitry configured to generate an image signal of a captured image, and to modify the image signal based on the detected change in the polarization direction of the intermediate light.

3. The imaging device according to claim 2, wherein
modifying the image signal is increasing a gain of the image signal.

4. The imaging device according to claim 2, further comprising:
sensitivity detecting circuitry configured to compute a sensitivity of a respective second pixel whose sensitivity varies in accordance with a difference between the polarization direction of the intermediate light and the predetermined polarization direction, wherein
in a case where a sensitivity difference between the respective second pixel and a respective first pixel is greater than a threshold, the image signal processing circuitry generates the image signal of the captured image having a dynamic range corresponding to the polarization direction of the intermediate light.

5. The imaging device according to claim 4, wherein
the image signal processing circuitry is configured to vary the dynamic range in accordance with the sensitivity computed by the sensitivity detecting circuitry.

6. The imaging device according to claim 5, wherein
the image signal processing circuitry is configured to carry out a gain adjustment for the respective first pixel on the basis of the sensitivity computed by the sensitivity detecting circuitry, to make an image combination by using an image signal which has been subjected to the gain adjustment, and to generate an output signal of the dynamic range corresponding to the sensitivity.

7. The imaging device according to claim 6, wherein
in a case where the respective second pixel is saturated in the image combination, the image signal processing circuitry is configured to switch an image signal of a captured image generated by using the respective second pixel to an image signal of a captured image generated by using the respective first pixel, the respective first pixel having lower sensitivity than the sensitivity of the respective second pixel.

8. The imaging device according to claim 7, wherein
the image signal processing circuitry is configured to control a combination ratio between an image signal of a captured image generated by using the plurality of first pixels and an image signal of a captured image generated by using the plurality of second pixels in accordance with the incident light, and to switch the image signal of the captured image generated by using the respective second pixel to the image signal of the captured image generated by using the respective first pixel.

9. The imaging device according to claim 4, wherein
in a case where the sensitivity difference between the respective second pixel and the respective first pixel is less than or equal to the threshold, the image signal processing circuitry generates, on the basis of a pixel signal of each pixel, an image signal of a captured image indicating an image of a corresponding pixel.

10. The imaging device according to claim 4, wherein the sensitivity detecting circuitry is configured to compute the sensitivity of the respective first pixel on the basis of the polarization direction of the intermediate light.

11. The imaging device according to claim 4, wherein the sensitivity detecting circuitry is configured to detect the sensitivity of the respective first pixel on the basis of a pixel signal generated by the respective first pixel.

12. The imaging device according to claim 3, further comprising:
a display section, wherein
the display section is configured to display the captured image and a user interface image for an operation of rotating the polarization direction of the intermediate light.

13. The imaging device according to claim 12, wherein the display section is configured to display an image indicating a signal strength distribution for the respective first pixel or the respective second pixel.

14. The imaging device according to claim 1, wherein the control circuitry is configured to control the polarization rotating section, so as to vary the polarization direction of the intermediate light in a manner that a signal strength of the plurality of second pixels is not saturated.

15. The imaging device according to claim 1, further comprising:
a rotation mechanism configured to rotate the polarizing element to any angle,
wherein the polarizing element is configured to transmit only a specific polarized wave of incident light.

16. The imaging device according to claim 1, wherein the polarizing filter is a linear polarizing filter.

17. A vehicle comprising the imaging device according to claim 1.

18. An imaging method comprising:
making incident light be incident on an imager including a plurality of first pixels arranged in an array and a plurality of second pixels by first passing through a polarizing element; and
detecting a change in a polarization direction of intermediate light between the imager and the polarizing element, in a case where the polarizing element is rotated with respect to the array, wherein
respective ones of the plurality of first pixels include a linear polarizing filter having a predetermined polarization direction with respect to a plane of the imager, and
respective ones of the plurality of second pixels do not include any polarizing filter.

19. A computing device, comprising:
a processor;
a memory; and
an imaging device, the imaging device including
an imager having
a plurality of first pixels arranged in an array, respective ones of the plurality of first pixels including a linear polarizing filter having a predetermined polarization direction with respect to a plane of the array, and
a plurality of second pixels, respective ones of the plurality of second pixels not including any polarizing filter;
a polarizing element provided on an incidence plane side of the imager; and
control circuitry configured to detect a change in a polarization direction of intermediate light between the imager and the polarizing element, in a case where the polarizing element is rotated with respect to the imager.

20. A vehicle comprising the computing device according to claim 19.

* * * * *